United States Patent
Kajihara et al.

(10) Patent No.: US 10,808,567 B2
(45) Date of Patent: Oct. 20, 2020

(54) PLANT CONTROL APPARATUS, PLANT CONTROL METHOD AND POWER PLANT

(71) Applicants: KABUSHIKI KAISHA TOSHIBA, Minato-ku (JP); TOSHIBA ENERGY SYSTEMS & SOLUTIONS CORPORATION, Kawasaki-shi (JP)

(72) Inventors: Mizu Kajihara, Yokohama (JP); Masayuki Tobou, Kawasaki (JP); Takahiro Mori, Yokohama (JP)

(73) Assignees: KABUSHIKI KAISHA TOSHIBA, Minato-ku (JP); TOSHIBA ENERGY SYSTEMS & SOLUTIONS CORPORATION, Kawasaki-shi (JP)

( * ) Notice: Subject to any disclaimer, the term of this patent is extended or adjusted under 35 U.S.C. 154(b) by 130 days.

(21) Appl. No.: 16/038,673

(22) Filed: Jul. 18, 2018

(65) Prior Publication Data
US 2019/0024529 A1  Jan. 24, 2019

(30) Foreign Application Priority Data

Jul. 21, 2017 (JP) .................. 2017-142218
Jun. 5, 2018 (JP) .................. 2018-107784

(51) Int. Cl.
*F01D 17/16* (2006.01)
*F02C 6/18* (2006.01)
(Continued)

(52) U.S. Cl.
CPC ............ *F01D 17/16* (2013.01); *F01D 21/12* (2013.01); *F01K 7/165* (2013.01); *F01K 13/02* (2013.01);
(Continued)

(58) Field of Classification Search
CPC ...... F02C 9/00; F02C 9/20; F02C 9/28; F02C 6/08; F02C 6/18; F02C 7/042;
(Continued)

(56) References Cited

U.S. PATENT DOCUMENTS 3,955,358 A * 5/1976 Martz .................... F01K 13/02
60/39.182
3,956,883 A * 5/1976 Anderson ............... F01D 19/00
60/790

(Continued)

FOREIGN PATENT DOCUMENTS

JP        62-153505       7/1987
JP       2680033 B2     11/1997
(Continued)

OTHER PUBLICATIONS

"Steam-generated nuclear power generation," Jun. 2009, 2 Pages (with Partial English Translation).

Primary Examiner — Alain Chau
(74) Attorney, Agent, or Firm — Oblon, McClelland, Maier & Neustadt, L.L.P.

(57) ABSTRACT

In one embodiment, a plant control apparatus controls a power plant that includes a combustor to burn fuel with oxygen introduced from an inlet guide vane to generate gas, a gas turbine driven by the gas from the combustor, a heat recovery steam generator to generate steam using heat of an exhaust gas from the gas turbine, and a steam turbine driven by the steam from the heat recovery steam generator. The apparatus controls an angle of the inlet guide vane before a start of the steam turbine to a first angle, controls the angle of the inlet guide vane after the start of the steam turbine to a second angle larger than the first angle, and reduce the angle of the inlet guide vane from the second angle to the first angle or more during the predetermined period.

14 Claims, 7 Drawing Sheets

(51) Int. Cl.
  *F01K 7/16* (2006.01)
  *F01K 23/10* (2006.01)
  *F02C 9/00* (2006.01)
  *F02C 3/04* (2006.01)
  *F01D 21/12* (2006.01)
  *F02C 9/20* (2006.01)
  *F01K 13/02* (2006.01)

(52) U.S. Cl.
  CPC ............ *F01K 23/10* (2013.01); *F01K 23/101* (2013.01); *F02C 3/04* (2013.01); *F02C 6/18* (2013.01); *F02C 9/00* (2013.01); *F02C 9/20* (2013.01); *F05D 2220/32* (2013.01); *F05D 2220/72* (2013.01); *F05D 2260/212* (2013.01); *F05D 2270/05* (2013.01); *F05D 2270/303* (2013.01); *F05D 2270/708* (2013.01)

(58) Field of Classification Search
  CPC .......... F02C 7/057; F01K 23/06; F01K 23/10; F01K 23/101; F01K 7/165; F01K 21/047; F01K 23/108; F01K 13/02; F01D 17/14; F01D 17/16; F01D 9/02; F01D 19/02; Y02E 20/16; F05D 2260/212; F05D 2270/03; F05D 2270/05; F05D 2270/303; F05D 2270/708; F22G 5/12
  See application file for complete search history.

(56) References Cited

U.S. PATENT DOCUMENTS

| | | | | |
|---|---|---|---|---|
| 3,965,675 | A * | 6/1976 | Martz | F01K 13/02 60/39.182 |
| 3,973,391 | A * | 8/1976 | Reed | F01K 23/105 60/794 |
| 3,974,643 | A * | 8/1976 | Smith | F02C 9/28 60/39.182 |
| 3,974,644 | A * | 8/1976 | Martz | F01K 9/04 60/39.182 |
| 3,974,645 | A * | 8/1976 | Smith | F01K 23/105 60/794 |
| 4,201,923 | A * | 5/1980 | Reed | F01K 23/105 290/40 R |
| 4,208,882 | A * | 6/1980 | Lopes | F01D 19/02 122/479.1 |
| 4,550,565 | A * | 11/1985 | Ozono | F01K 23/101 60/39.182 |
| 4,589,255 | A * | 5/1986 | Martens | F01D 17/085 60/646 |
| 4,638,630 | A * | 1/1987 | Martens | F01D 21/12 60/39.182 |
| 5,044,152 | A | 9/1991 | Hoizumi et al. | |
| 7,274,111 | B2 * | 9/2007 | Andrew | F01D 15/10 290/2 |
| 7,355,297 | B2 * | 4/2008 | Andrew | F01D 15/10 290/2 |
| 9,394,808 | B2 * | 7/2016 | Brighenti | F01K 21/00 |
| 9,404,426 | B2 * | 8/2016 | Wichmann | F02C 9/50 |
| 9,523,313 | B2 * | 12/2016 | Kim | F02C 7/057 |
| 9,945,264 | B2 * | 4/2018 | Wichmann | F01K 23/101 |
| 10,012,151 | B2 * | 7/2018 | Thatcher | F02C 7/057 |
| 10,450,900 | B2 * | 10/2019 | Iida | F02C 9/28 |
| 10,526,923 | B2 * | 1/2020 | Fujimura | F01K 7/16 |
| 2010/0236241 | A1 * | 9/2010 | Kumar | F22G 5/12 60/653 |
| 2013/0239573 | A1 * | 9/2013 | Brighenti | F01K 21/00 60/643 |
| 2014/0325990 | A1 * | 11/2014 | Takeda | F01K 21/047 60/775 |
| 2015/0000293 | A1 * | 1/2015 | Thatcher | F02C 1/08 60/772 |
| 2015/0176437 | A1 * | 6/2015 | Tobo | F01K 23/101 60/778 |
| 2015/0184550 | A1 * | 7/2015 | Wichmann | F01K 13/02 700/287 |
| 2015/0185716 | A1 * | 7/2015 | Wichmann | G05F 1/66 700/287 |
| 2015/0345387 | A1 * | 12/2015 | Tobo | F02C 7/26 60/774 |
| 2016/0146118 | A1 * | 5/2016 | Wichmann | F01D 21/003 701/100 |
| 2016/0147204 | A1 * | 5/2016 | Wichmann | G05B 13/042 700/287 |
| 2017/0138220 | A1 | 5/2017 | Fujimura et al. | |
| 2017/0167300 | A1 * | 6/2017 | Mathai | F02C 9/20 |
| 2017/0183980 | A1 * | 6/2017 | Iida | F01K 7/165 |
| 2018/0010526 | A1 | 1/2018 | Mori et al. | |

FOREIGN PATENT DOCUMENTS

JP    2018-003824    1/2018
KR    10-2016-0111510 A    9/2016

* cited by examiner

PLANT CONTROL APPARATUS, PLANT CONTROL METHOD AND POWER PLANT

CROSS REFERENCE TO RELATED APPLICATIONS

This application is based upon and claims the benefit of priority from the prior Japanese Patent Applications No. 2017-142218, filed on Jul. 21, 2017 and No. 2018-107784, filed on Jun. 5, 2018, the entire contents of which are incorporated herein by reference.

FIELD

Embodiments described herein relate to a plant control apparatus, a plant control method and a power plant.

BACKGROUND

A combined-cycle power plant (C/C power plant) generally includes a gas turbine, a heat recovery steam generator and a steam turbine, and performs thermal power generation using energy generated by combustion of fuel. Specifically, the gas turbine is driven by gas supplied from a combustor that burns the fuel. The heat recovery steam generator generates steam using heat of an exhaust gas discharged from the gas turbine. The steam turbine is driven by the steam supplied from the heat recovery steam generator.

DETAILED DESCRIPTION

Figure 1:
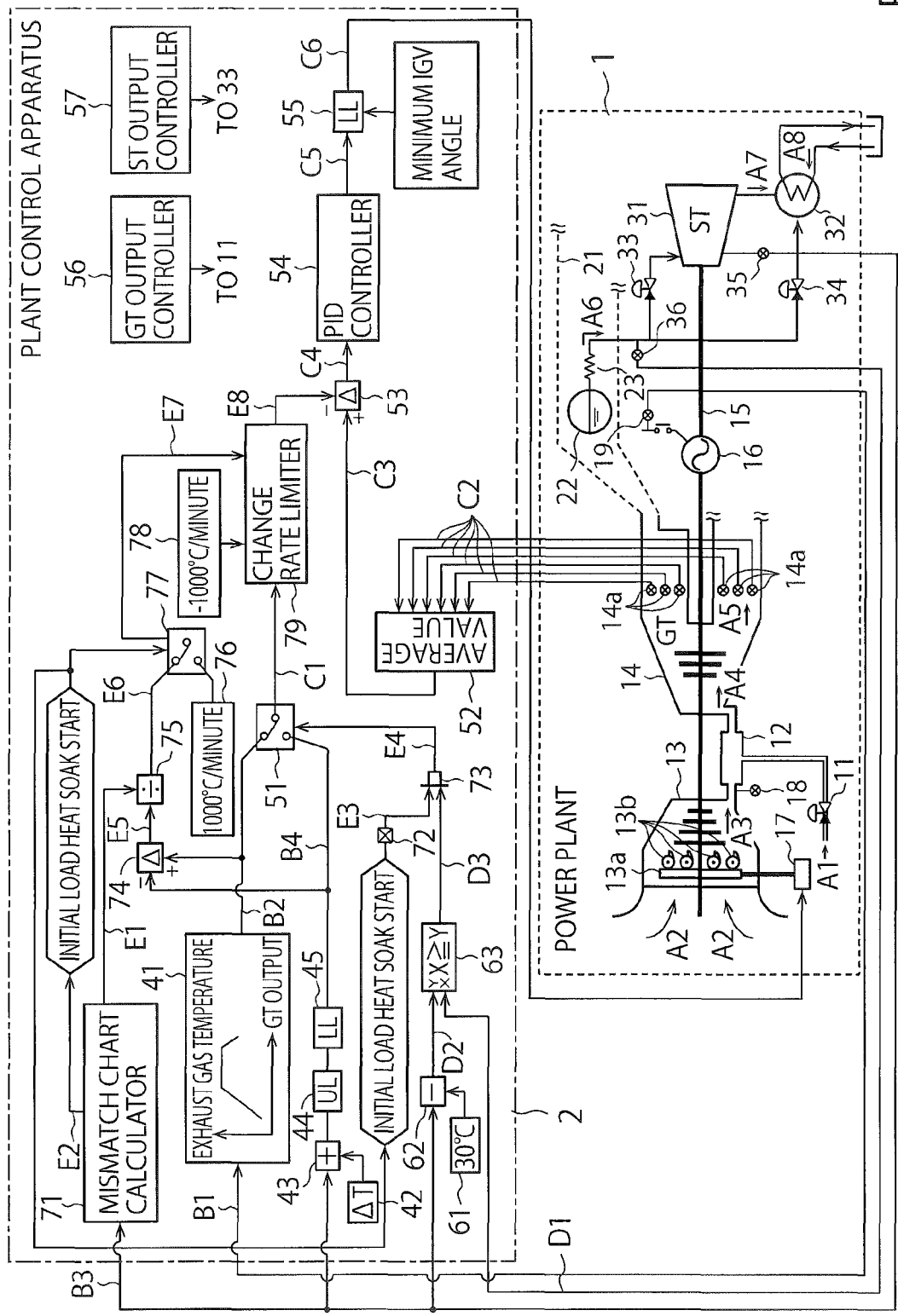
FIG. 1 is a schematic diagram illustrating a configuration of a power plant in a first embodiment.

Embodiments will now be explained with reference to the accompanying drawings. In FIGS. 1 to 7, the same or similar components are denoted by the same reference numerals and signs, and redundant explanation of the components is omitted.

Since a conventional C/C power plant adopts a gas turbine having a small capacity, a steam turbine combined with this gas turbine also has a small capacity. Therefore, thermal stress generated in the steam turbine does not cause a significant problem.

However, in the latest gas turbine adopted in C/C power plants in these days, a turbine inlet temperature (combustion temperature) and a capacity have been markedly increased. Therefore, a steam turbine combined with this gas turbine also has a large capacity, and thermal stress generated in the steam turbine on startup causes a significant problem. Therefore, it is necessary to perform heat soak for gently raising a steam temperature of the steam turbine to relax the thermal stress before increasing an output of the steam turbine to a rated value. At this time, similarly to heat soak carried out in a steam power plant, it is requested to introduce heat soak considering account limitations and characteristics of the C/C power plants.

In one embodiment, a plant control apparatus controls a power plant that includes a combustor configured to burn fuel with oxygen introduced from an inlet guide vane to generate gas, a gas turbine driven by the gas from the combustor, a heat recovery steam generator configured to generate steam using heat of an exhaust gas from the gas turbine, and a steam turbine driven by the steam from the heat recovery steam generator. The apparatus includes a first output controller configured to control an output value of the gas turbine, and a second output controller configured to control an output value of the steam turbine, the second output controller retaining the output value of the steam turbine at a predetermined value for a predetermined period. The apparatus further includes an angle controller configured to control an angle of the inlet guide vane before a start of the steam turbine to a first angle, control the angle of the inlet guide vane after the start of the steam turbine to a second angle larger than the first angle, and reduce the angle of the inlet guide vane from the second angle to the first angle or to a third angle larger than the first angle and smaller than the second angle during the predetermined period.

First Comparative Example

Figure 3:
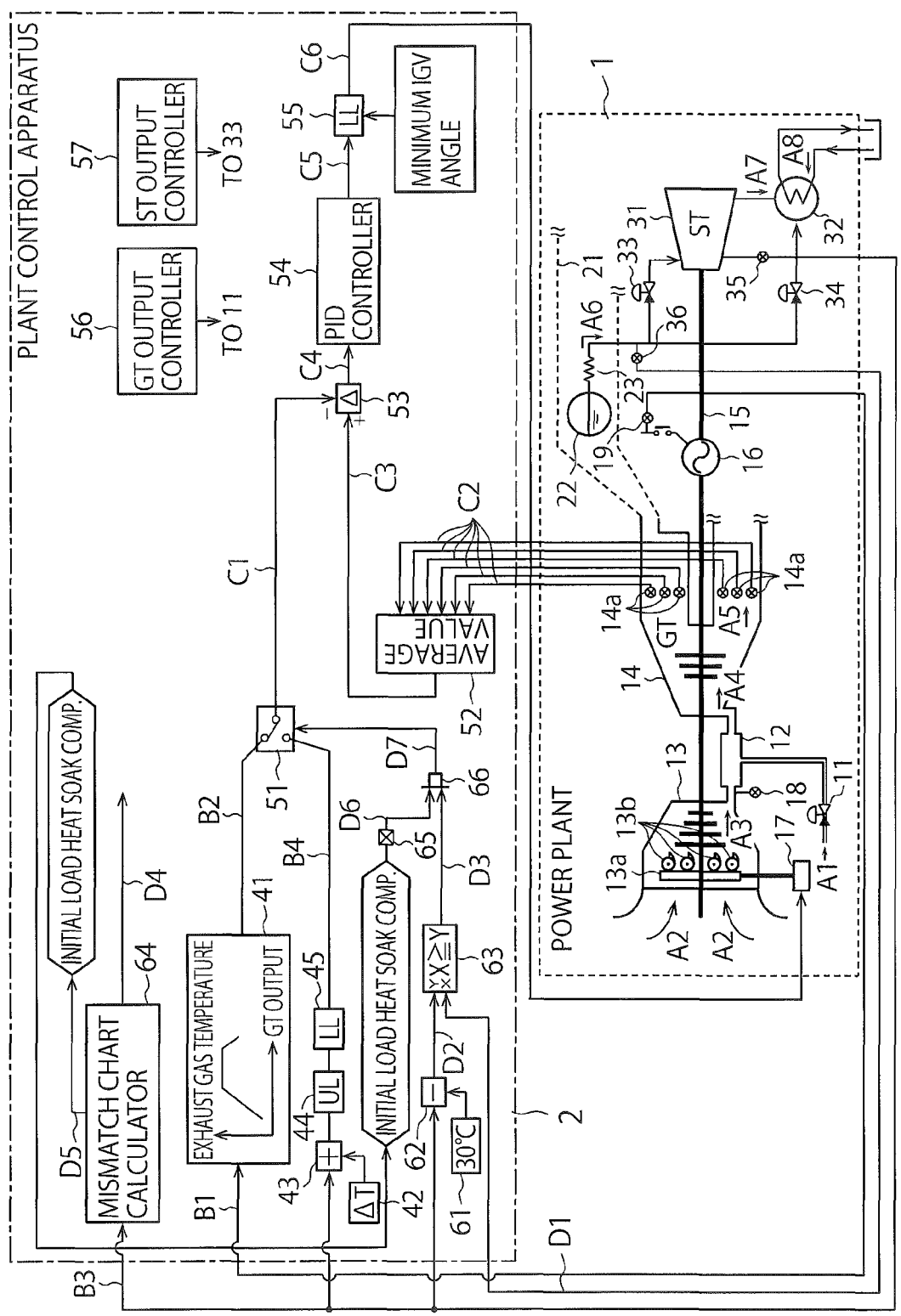
FIG. 3 is a schematic diagram illustrating a configuration of a power plant in a first comparative example.

FIG. 3 is a schematic diagram illustrating a configuration of a power plant 1 in a first comparative example. The power plant 1 in this comparative example includes a plant control apparatus 2 that controls the power plant 1. The power plant 1 in this comparative example is a C/C power plant of a uniaxial direct connection type.

The power plant 1 includes a fuel flow control valve 11, a combustor 12, a compressor 13, a gas turbine 14, a rotating shaft 15, a power generator 16, a servo valve 17, a compressed air temperature sensor 18, an output sensor 19, a heat recovery steam generator 21, a drum 22, a superheater 23, a steam turbine 31, a condenser 32, a regulating valve 33, a bypass control valve 34, a metal temperature sensor 35 and a main steam temperature sensor 36. The compressor 13 includes an inlet 13a and a plurality of inlet guide vanes (IGVs) 13b. The gas turbine 14 includes a plurality of exhaust gas temperature sensors 14a.

The plant control apparatus 2 includes a function generator 41, a setter 42, an adder 43, an upper limiter 44, a lower limiter 45, a switcher 51, an average value operator 52, a subtractor 53, a proportional-integral-derivative (PID) controller 54, a lower limiter 55, a setter 61, a subtractor 62, a comparator 63, a mismatch chart calculator 64, a NOT gate 65 and an AND gate 66. These blocks control the operation of the servo valve 17 to function as an angle controller that controls an angle (opening degree) of the IGVs 13b.

The plant control apparatus 2 further includes a GT (gas turbine) output controller 56 that controls an output of the gas turbine 14 and a ST (steam turbine) output controller 57 that controls the operation of the regulating valve 33 (or the operation of the bypass control valve 34) to control an output of the steam turbine 31. The GT output controller 56 is an example of a first output controller. The ST output controller 57 is an example of a second output controller.

The fuel flow control valve 11 is provided in a fuel pipe. When the fuel flow control valve 11 is opened, fuel A1 is supplied from the fuel pipe to the combustor 12. The compressor 13 includes the IGVs 13b provided in the inlet 13a. The compressor 13 introduces air A2 from the inlet 13a via the IGVs 13b and supplies compressed air A3 to the combustor 12. The combustor 12 burns the fuel A1 together with oxygen in the compressed air A3 and generates a high-temperature and high-pressure combustion gas A4.

The gas turbine 14 is driven rotationally by the combustion gas A4 to rotate the rotating shaft 15. The power generator 16 is connected to the rotating shaft 15 and performs power generation using the rotation of the rotating shaft 15. An exhaust gas A5 discharged from the gas turbine 14 is delivered to the heat recovery steam generator 21. Each of the exhaust gas temperature sensors 14a detects the temperature of the exhaust gas A5 near an output of the gas turbine 14 and outputs a result of the temperature detection to the plant control apparatus 2. As explained below, the heat recovery steam generator 21 generates steam using heat of the exhaust gas A5.

The servo valve 17 is used to adjust the angle of the IGVs 13b. The compressed air temperature sensor 18 detects the temperature of the compressed air A3 near an outlet of the compressor 13 and outputs a result of the temperature detection to the plant control apparatus 2. The output sensor 19 is provided in the power generator 16. The output sensor 19 detects an electric output of the power generator 16 and outputs a result of the output detection to the plant control apparatus 2. The electric output of the power generator 16 is equivalent to a total of an output of the gas turbine 14 (work given to the outside by the gas turbine 14) and an output of the steam turbine 31 (work given to the outside by the steam turbine 31).

The drum 22 and the superheater 23 are provided in the heat recovery steam generator 21 and configure a part of the heat recovery steam generator 21. Water in the drum 22 is delivered to a not-illustrated evaporator and heated by the exhaust gas A5 in the evaporator to be saturated steam. The saturated steam is delivered to the superheater 23 and superheated by the exhaust gas A5 in the superheater 23 to be superheated steam A6. The superheated steam A6 generated by the heat recovery steam generator 21 is discharged to steam piping. In the following explanation, the superheated steam A6 is referred to as main steam.

The steam piping is branched into main piping and bypass piping. The main piping is connected to the steam turbine 31. The bypass piping is connected to the condenser 32. The regulating valve 33 is provided in the main piping. The bypass control valve 34 is provided in the bypass piping.

When the regulating valve 33 is opened, the main steam A6 from the main piping is supplied to the steam turbine 31. The steam turbine 31 is driven rotationally by the main steam A6 to rotate the rotating shaft 15 in conjunction with the gas turbine 14. Main steam A7 discharged from the steam turbine 31 is delivered to the condenser 32.

When the bypass control valve 34 is opened, the main steam A6 from the bypass piping bypasses the steam turbine 31 and is delivered to the condenser 32. The condenser 32 cools the main steam A6 and main steam A7 using circulating water A8 to condense the main steam A6 and the main steam A7 into water. When the circulating water A8 is seawater, the circulating water A8 discharged from the condenser 32 is returned to the sea.

The metal temperature sensor 35 detects the metal temperature of a first stage inner surface of the steam turbine 31 and outputs a result of the temperature detection to the plant control apparatus 2. The main steam temperature sensor 36 detects the temperature of the main steam A6 in the vicinity of a main steam flow outlet of the heat recovery steam generator 21 and outputs a result of the temperature detection to the plant control apparatus 2.

The temperature of the exhaust gas A5 can be controlled by adjusting an amount of supply of the fuel A1 or a flow rate of the air A2. Details of the amount of supply of the fuel A1 and the flow rate of the air A2 are explained below.

The amount of supply of the fuel A1 is controlled by controlling an angle of the fuel flow control valve 11. The GT output controller 56 in the plant control apparatus 2 outputs a valve control command signal for controlling the angle of the fuel flow control valve 11 to adjust the amount of supply of the fuel A1. For example, when the amount of supply of the fuel A1 increases, the temperature of the combustion gas A4 drops, the output value of the gas turbine 14 decreases, and the temperature of the exhaust gas A5 drops. On the other hand, when the amount of supply of the fuel A1 decreases, the temperature of the combustion gas A4 rises, the output value of the gas turbine 14 increases, and the temperature of the exhaust gas A5 rises. As seen from the above, the output controller 56 can control the output value of the gas turbine 14 by controlling the angle of the fuel flow control valve 11. Consequently, the GT output controller 56 can control the temperature of the exhaust gas A5.

The flow rate of the air A2 is adjusted by controlling the angle of the IGVs 13b. Like the angle of the fuel flow control valve 11, the angle of the IGVs 13b is controlled by the plant control apparatus 2. The compressor 13 sucks the air A2 through the IGVs 13b and compresses the air A2 to generate the compressed air A3. For example, when the angle of the IGVs 13b increases, the flow rate of the air A2 increases and a flow rate of the compressed air A3 increases. At this point, the temperature of the compressed air A3 becomes higher than the original temperature of the air A2 (substantially the atmospheric temperature) through a compression process but is very low compared with the temperature of the combustion gas A4. As a result, when the angle of the IGVs 13b increases, the influence of the compressed air A3 increases, the temperature of the combustion gas A4 drops, and the temperature of the exhaust gas A5 drops. On the other hand, when the angle of the IGVs 13b decreases, the influence of the compressed air A3 decreases, the temperature of the combustion gas A4 rises, and the temperature of the exhaust gas A5 rises. As seen from the above, by controlling the angle of the IGVs 13b, the plant control apparatus 2 can control the temperature of the exhaust gas A5. When changing the angle of the IGVs 13b while keeping the amount of supply of the fuel A1 constant, the output value of the gas turbine 14 changes little.

Figure 4:
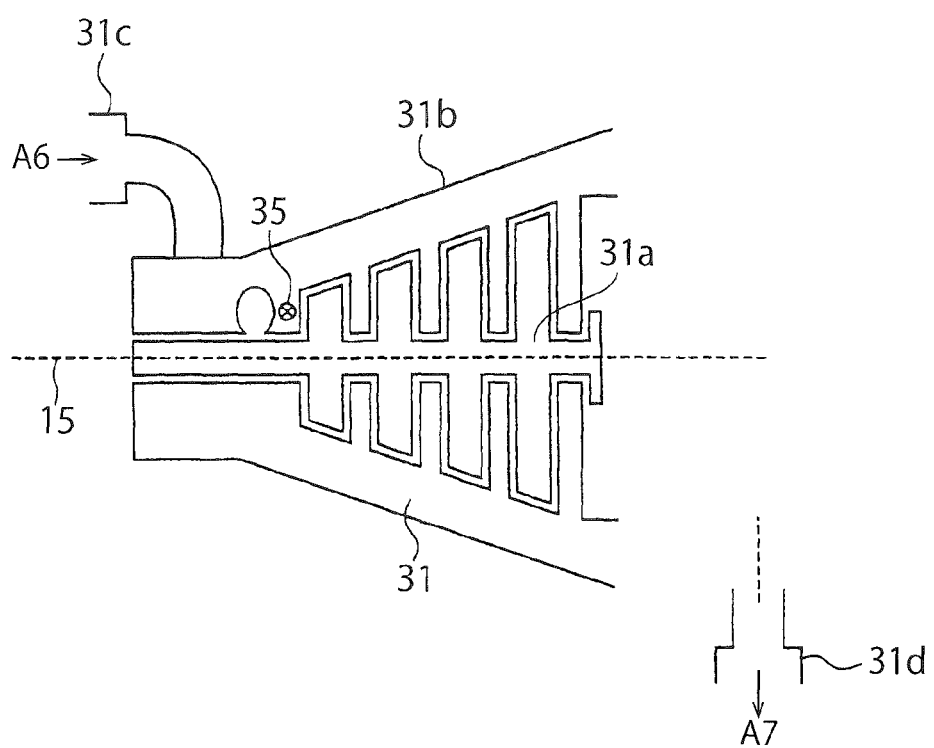
FIG. 4 is a sectional view illustrating the structure of a steam turbine in the first comparative example.

FIG. 4 is a cross-sectional view illustrating the structure of the steam turbine 31 in the first comparative example.

The steam turbine 31 includes a rotor 31a including a plurality of rotor blades, a stator 31b including a plurality of stator vanes, a steam flow inlet 31c, and a steam flow outlet 31d. The main steam A6 is introduced from the steam flow inlet 31c, passes through the steam turbine 31, and is discharged from the steam flow outlet 31d as the main steam A7.

FIG. 4 illustrates the position where the metal temperature sensor 35 is installed. The metal temperature sensor 35 is installed in the vicinity of the inner surface of a first stage stator vane in the steam turbine 31. Therefore, the metal temperature sensor 35 can detect the metal temperature of the inner surface of the first stage stator vane.

Referring back to FIG. 3, details of the plant control apparatus 2 are explained below.

The function generator 41 generates a function indicating the correlation between the output value of the gas turbine 14 (hereinafter, referred to as "GT output value") and the temperature of the exhaust gas A5 in normal time (hereinafter, referred to as "exhaust gas temperature"). The function generator 41 acquires a measured value B1 of the GT output value from the output sensor 19 and outputs a setting value B2 of the exhaust gas temperature corresponding to the measured value B1 according to a function curve set in the function generator 41.

The function generator 41 may generate a function indicating the correspondence relation between the pressure of the compressed air A3 (hereinafter, referred to as "compressed air pressure") and an exhaust gas temperature in normal time. In this case, the function generator 41 acquires a measured value of the compressed air pressure and outputs a setting value B2 of the exhaust gas temperature corresponding to this measured value.

The setter 42 retains a setting value $\Delta T$ for the temperature difference on startup between the exhaust gas temperature and the metal temperature of the first stage inner surface in the steam turbine 31 (hereinafter, referred to as "metal temperature"). The adder 43 acquires a measured value B3 of the metal temperature from the metal temperature sensor 35 and acquires the setting value $\Delta T$ from the setter 42. Then, the adder 43 adds the setting value $\Delta T$ to the measured value B3 of the metal temperature and outputs a setting value "B3+$\Delta T$" of the exhaust gas temperature.

The upper limiter 44 retains an upper limit value UL of the exhaust gas temperature and outputs either the setting value B3+$\Delta T$ or the upper limit value UL, whichever is smaller. The lower limiter 45 retains a lower limit value LL of the exhaust gas temperature and outputs either the output of the upper limiter 44 or the lower limit value LL, whichever is larger. Therefore, the lower limiter 45 outputs a middle value of the setting value B3+$\Delta T$, the upper limit value UL, and the lower limit value LL as a setting value B4 of the exhaust gas temperature. This means that the setting value "B3+$\Delta T$" of the exhaust gas temperature is limited to a value between the upper limit value UL and the lower limit value LL.

Since the power plant 1 in this comparative example is started by a cold start, the setting value B3 of the metal temperature is a low temperature. Therefore, B3+$\Delta T$ is also a low temperature. Therefore, the setting value B4 is often the lower limit value LL. In this case, since thermal stress easily occurs in the steam turbine 31, the plant control apparatus 2 includes a block for heat soak as explained below.

The setter 61 retains a setting value (30° C.) of a temperature difference between the temperature of the main steam A6 (hereinafter, referred to as "main steam temperature") and the metal temperature. The subtractor 62 acquires the measured value B3 of the metal temperature from the metal temperature sensor 35 and acquires the setting value of temperature difference from the setter 61. Then, the subtractor 62 subtracts the setting value of the temperature difference from the measured value B3 of the metal temperature and outputs "B3−30° C.", which is a setting value D2 of the main steam temperature.

The comparator 63 acquires a measured value D1 of the main steam temperature from the main steam temperature sensor 36 and acquires the setting value D2 of the main steam temperature from the subtractor 62. Then, the comparator 63 compares the measured value D1 of the main steam temperature and the setting value D2 and outputs a switching signal D3 corresponding to a result of the comparison.

The mismatch chart calculator 64 acquires the measured value B3 of the metal temperature from the metal temperature sensor 35 and calculates, based on the measured temperature B3 of the metal temperature, an initial load heat soak time D4 of the steam turbine 31 and outputs the initial load heat soak time D4. In this comparative example, an example is explained below in which the initial load heat soak time is 90 minutes. When initial load heat soak operation of the steam turbine 31 continues for an initial load heat soak time D4, the mismatch chart calculator 64 outputs an initial load heat soak completion signal D5.

The NOT gate 65 acquires the initial load heat soak completion signal D5 from the mismatch chart calculator 64 and outputs a NOT operation result D6 of the initial load heat soak completion signal D5. Specifically, when the initial load heat soak completion signal D5 is ON (1), the NOT operation result D6 is 0. When the initial load heat soak completion signal D5 is OFF (0), the NOT operation result D6 is 1.

The AND gate 66 acquires the switching signal D3 from the comparator 63 and acquires the NOT operation result D6 from the NOT gate 65. The AND gate 66 outputs a switching signal D7 indicating an AND operation result of the switching signal D3 and the NOT operation result D6.

The switcher 51 acquires the setting value B2 of the exhaust gas temperature in normal time from the function generator 41, acquires the setting value B4 of the exhaust gas temperature on startup from the lower limiter 45, and outputs a setting value C1 of the exhaust gas temperature according to the switching signal D7 output from the AND gate 66. The operation of the switcher 51 is explained below based on characteristics of the switching signal D3 and the switching signal D7.

An instruction of the switching signal D3 changes according to whether the measured value D1 (X) of the main steam temperature rises to the setting value D2 (Y) and reaches the setting value D2 (Y) (X≥Y). Therefore, an instruction of the switching signal D7 changes according to whether the measured value D1 of the main steam temperature reaches the setting value D2 and whether the initial load heat soak operation of the steam turbine 31 is completed. As explained below with reference to FIG. 5, the initial load heat soak operation is completed far later than when the measured value D1 of the main steam temperature reaches the setting value D2. Therefore, the explanation referring to FIG. 3 is limited to a situation before the initial load heat soak operation is completed. Therefore, in the explanation referring to FIG. 3, the initial load heat soak completion signal D5 is always OFF (0). The instruction of the switching signal D7 always coincides with the instruction of the switching signal D3.

Therefore, before the measured value D1 reaches the setting value D2, the switcher 51 maintains the setting value C1 at the setting value B2 of the exhaust gas temperature in normal time. On the other hand, when the measured value D1 reaches the setting value D2, the switcher 51 switches the setting value C1 to the setting value B4 of the exhaust gas temperature on startup. The setting value C1 is used as a setting value (an SV value) of PID control. In the following explanation, the setting value C1 is described as SV value as well.

The average value operator 52 acquires measured values C2 of the exhaust gas temperatures from the respective exhaust gas temperature sensors 14a in the gas turbine 14. These exhaust gas temperature sensors 14a are installed along the circumference of a discharge unit of the gas turbine 14. The average value operator 52 calculates and outputs an average value C3 of these measured values C2. The average value C3 is used as a process value (a PV value)

in the PID control. In the following explanation, the average value C3 is referred to as PV value as well.

The subtractor 53 acquires an SV value C1 of the exhaust gas temperature from the switcher 51 and acquires a PV value C3 of the exhaust gas temperature from the average value operator 52. The subtractor 53 subtracts the SV value C1 from the PV value C3 and outputs a deviation C4 between the SV value C1 of the exhaust gas temperature and the PV value C3 (deviation C4=PV value C3−SV value C1).

The PID controller 54 acquires the deviation C4 from the subtractor 53 and performs PID control to bring the deviation C4 close to zero. An amount of manipulation (an MV value) C5 output from the PID controller 54 is the angle of the IGVs 13b (hereinafter, referred to as "IGV angle"). When the PID controller 54 changes the MV value C5, the IGV angle changes and the exhaust gas temperature changes. As a result, the PV value C3 of the exhaust gas temperature changes to approach the SV value C1.

As seen from the above, the PID controller 54 performs feedback control to control the exhaust gas temperature. Specifically, the PID controller 54 calculates the MV value C5 based on the deviation C4 between the SV value C1 and the PV value C3 of the exhaust gas temperature and controls the exhaust gas temperature through the control of the MV value C5.

An excessively small IGV angle may impair the combustion in the combustor 12. For this reason, the MV value C5 is input into the lower limiter 55 that retains the lower limit value LL (a minimum IGV angle) of the IGV angle. The lower limiter 55 outputs either the MV value C5 or the lower limit value LL, whichever is larger, as a corrected MV value C6.

The plant control apparatus 2 outputs the MV value C6 to drive the servo valve 17 and controls the IGV angle with hydraulic working of the servo valve 17. As a result, the IGV angle changes according to the MV value C6 and the PV value C3 of the exhaust gas temperature changes to approach the SV value C1.

A difference between the setting value B2 of the exhaust gas temperature in normal time and the setting value B4 of the exhaust gas temperature on startup is explained.

The setting value B2 of the exhaust gas temperature in normal time is used, for example, on startup of the power plant 1, until the main steam temperature satisfies a predetermined condition. The setting value B4 of the exhaust gas temperature on startup is used, for example, on startup of the power plant 1, after the main steam temperature satisfies the predetermined condition.

[Setting Value B2 of Exhaust Gas Temperature in Normal Time]

On startup of the power plant 1 of the combined-cycle type, it is desirable to increase the exhaust gas temperature to facilitate the generation of the main steam A6. For this reason, the function curve of the function generator 41 is generally set so that the exhaust gas temperature becomes a relatively high temperature.

Therefore, when the setting value C1 of the exhaust gas temperature is set at the setting value B2 in normal time, the deviation C4 is kept at a negative value and the MV value C6 of IGV angle is kept at the minimum IGV angle. That is, immediately after the startup of the power plant 1, the IGV angle is kept at the minimum IGV angle irrespective of the GT output value. The value of the minimum IGV angle is set to, for example, an angle between 30% and 50%.

[Setting Value B4 of Exhaust Gas Temperature on Startup]

The setting value B4 of the exhaust gas temperature on startup is used to set the main steam temperature at a temperature suitable for the startup of the steam turbine 31. Specifically, when the measured value B1 of GT output value reaches an initial load, the setting value C1 of the exhaust gas temperature is switched from the setting value B2 in normal time to the setting value B4 on startup to bring the main steam temperature close to the metal temperature. The setting value B4 is usually given as a sum of the measured value B3 of the metal temperature and the setting value ΔT for a temperature difference (i.e., exhaust gas temperature=metal temperature+ΔT).

This configuration reduces a mismatch between the main steam temperature and the metal temperature. When steam injection of the steam turbine 31 is performed in this state, the main steam A6 with less thermal stress generated in the steam turbine 31 is obtained. The setting value ΔT is, for example, 30° C.

However, if the setting value B4 of the exhaust gas temperature reaches an excessively large or small value, an inconvenience occurs in the operation of the gas turbine 14 and the heat recovery steam generator 21. For this reason, the setting value B4 is set by limiting the value of "metal temperature+ΔT" to a value between the upper limit value UL and the lower limit value LL.

In the above explanation, the example is explained in which the SV value C1 of the exhaust gas temperature is switched from the setting value B2 to the setting value B4. However, when the initial load heat soak of the steam turbine 31 is completed, conversely, the SV value C1 of the exhaust gas temperature is switched from the setting value B4 to the setting value B2. Specifically, when the initial load heat soak is completed, the initial load heat soak completion signal D5 is 1 and the NOT operation result D6 is 0. Therefore, even when the instruction of the switching signal D4 is the setting value B4, the instruction of the switching signal D7 is the setting value B2. Therefore, when the initial load heat soak is completed, the switcher 51 switches the SV value C1 from the setting value B4 to the setting value B2. Details of such a switching process are explained with reference to FIG. 5.

Figure 5:
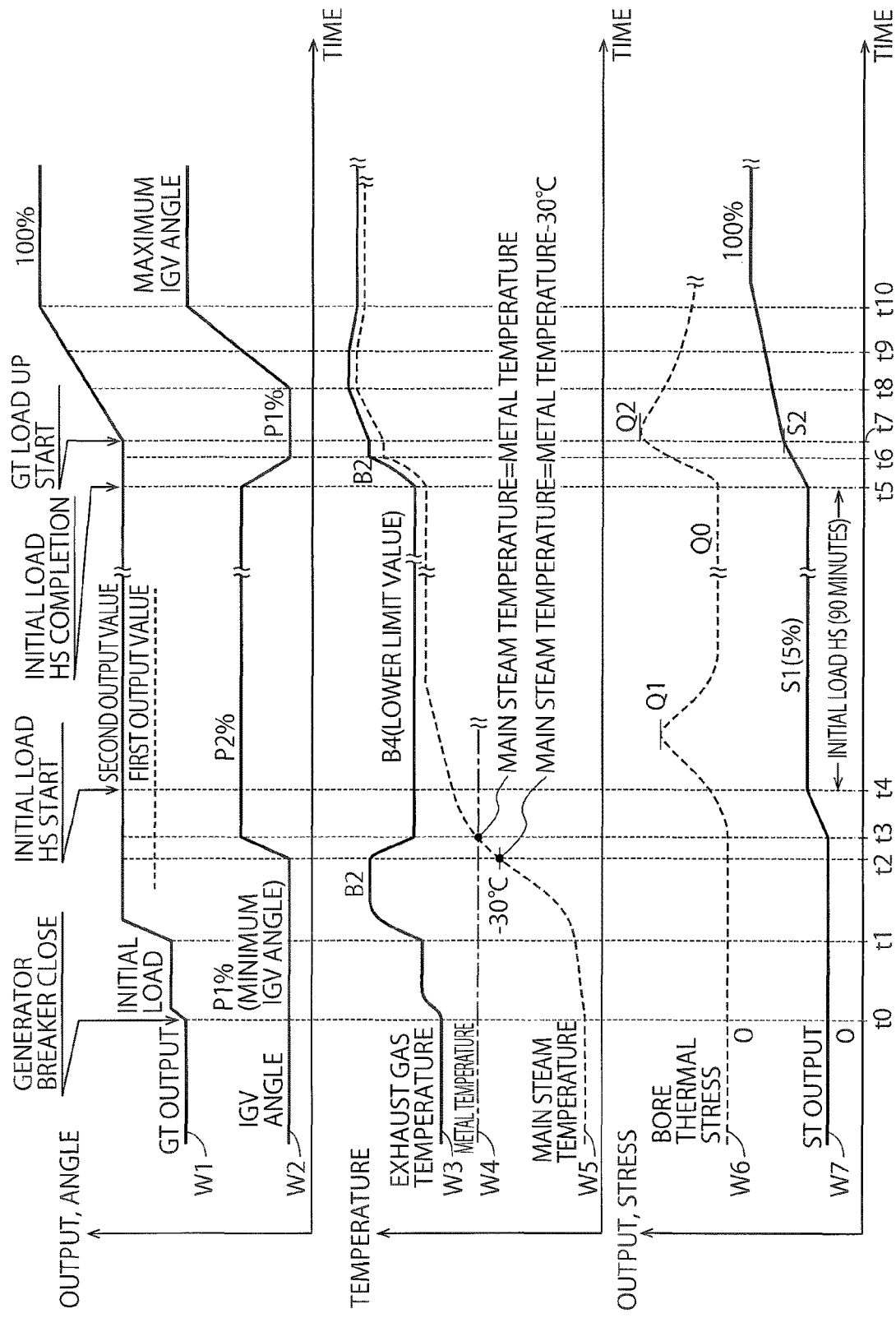
FIG. 5 is a graph for explaining the operation of the power plant in the first comparative example.

FIG. 5 is a graph for explaining the operation of the power plant 1 in the first comparative example.

[Time Point t0]

When the power generator 16 is brought into the breaker close operation at a time point t0, the GT output value starts increasing from zero toward the initial load (waveform W1). Consequently, the exhaust gas temperature and the main steam temperature start to rise (waveforms W3 and W5). At this point, since the measured value D1 of the main steam temperature is lower than the setting temperature D2, the SV value C1 of the exhaust gas temperature is set to the setting value B2 in normal time. Since the setting value B2 is generally a high temperature, the deviation C4 is maintained at a minus value and the IGV angle is maintained at P1%, which is a minimum IGV angle (waveform W2). In this comparative example, since the cold start is performed, the metal temperature is low temperature (waveform W4).

[Time Point t1]

The GT output controller 56 switches the setting value of the GT output value at a time point t1. Therefore, the GT output value starts to increase from the initial load toward a second output value at the time point t1 (waveform W1). Consequently, the exhaust gas temperature rises to the setting value B2 (waveform W3). On the other hand, the main steam temperature continues to rise (waveform W5).

[Time Point t2]

When the main steam temperature reaches the metal temperature −30° C. at a time point t2 (waveform W5), the SV value C1 of the exhaust gas temperature is switched to the setting value B4 on startup. At this time, since the measured value B3 of the metal temperature is a low temperature (waveform W4), the setting value B4 is generally a low temperature. Therefore, the deviation C4 has a plus value and the IGV angle starts to increase from P1% to P2% (waveform W2). Consequently, the exhaust gas temperature decreases to the setting value B4 (waveform W3). The main steam temperature continues to rise (waveform W5). The angle P1% is an example of a first angle. The angle P2% is an example of a second angle. The angles P1% and P2% are respectively angles at which the exhaust gas temperature can be maintained at the setting value B4 when the GT output value is a first output value and a second output value. A relation of P1%<P2% holds. The GT output value is maintained at the second output value also after the time point t2 (waveform W1).

[Time Point t3]

At a time point t3, the IGV angle reaches P2% and the exhaust gas temperature reaches the setting value B4 (waveforms W2 and W3). The main steam temperature reaches the metal temperature around the time point t3 (waveform W5). Therefore, the ST output controller 57 opens the regulating valve 33 at the time point t3 to start the steam injection of the steam turbine 31 and gradually increases the angle of the regulating valve 33. In this way, the steam turbine 31 is started and an output value of the steam turbine 31 (hereinafter, referred to as "ST output value") starts to increase from zero toward S1 (5%) (waveform W7).

In this comparative example, since the setting value B4 of the exhaust gas temperature is the lower limit value LL (waveform W3), the main steam temperature at the time point t3 temporarily has a value near the metal temperature (waveform W5). Thereafter, the main steam temperature rises following the exhaust gas temperature. The main steam temperature reaches temperature higher than the metal temperature. Whereas the surface of the rotating shaft 15 (a turbine rotor) in contact with the high-temperature main steam has a high temperature, the inside of the rotating shaft 15 not in contact with the high-temperature main steam is maintained at a low temperature. As a result, distortion due to thermal expansion of the rotating shaft 15 occurs. Turbine rotor bore thermal stress (hereinafter, referred to as "bore thermal stress") occurs in the steam turbine 31. The turbine rotor bore is a cylindrical inner hollow section (bore) provided in the rotating shaft 15 (the turbine rotor). After the time point t3, the bore thermal stress increases according to the rise in the main steam temperature (waveform W6).

Since the gas turbine 14 and the steam turbine 31 in this comparative example is directly connected to the same rotating shaft 15, the rotating speed of the steam turbine 31 increases according to driving by the gas turbine 14. Specifically, the steam turbine 31 is driven by the gas turbine 14 from the time point t0 and operated at rated rotating speed. At the time point t3, the operation is continued. Before the time point t3, the regulating valve 33 is fully closed and the main steam A6 does not flow into the steam turbine 31. Therefore, the bore thermal stress of the steam turbine 31 is zero without occurring (waveform W6).

The lower limit value LL of the setting value B4 of the exhaust gas temperature is explained. In general, during the steam injection of the steam turbine 31, it is desirable that the main steam temperature is desirably close to the metal temperature to reduce the thermal stress. Therefore, the adder 43 in this comparative example outputs "B3+ΔT" as an ideal setting value of the exhaust gas temperature. However, the metal temperature is a low temperature of 80° C. to 160° C. in a typical cold start. An ideal setting value of the exhaust gas temperature is steadily near 80° C. to 160° C. This exhaust gas temperature is a low temperature at which normal combustion operation is impossible. Therefore, the lower limit value LL in this comparative example is set to a lowest exhaust gas temperature at which the normal combustion operation of the gas turbine 14 is possible. The steam injection of the steam turbine 31 is started when the main steam temperature temporarily has a value near the metal temperature. Thereafter, the main steam temperature inevitably rises following the exhaust gas temperature. In that process, large bore thermal stress occurs in the steam turbine 31.

As the thermal stress that occurs in the steam turbine 31, there are thermal stress that occurs in the bore of the turbine rotor and thermal stress that occurs on the surface of the turbine rotor. When the main steam temperature is higher than the metal temperature, a polarity of the former thermal stress has a plus value and a polarity of the latter thermal stress has a minus value. In this comparative example, both the thermal stresses are a problem. FIG. 5 illustrates the former thermal stress (the bore thermal stress) as a representative.

[Time Point t4]

At a time point t4, the ST output value reaches a 5% load (S1) (waveform W7). The initial load heat soak of the steam turbine 31 (hereinafter abbreviated as "initial load HS" as appropriate) is started. The ST output value is retained at the 5% load for 90 minutes from the time point t4. The ST output value of 5% is an example of a predetermined value of an output value of the steam turbine 31. A period of 90 minutes is an example of a predetermined period in which the output value of the steam turbine 31 is retained at the predetermined value. The numerical values of 90 minutes and 5% described here are examples for convenience of explanation.

The main steam temperature continues to rise until the main steam temperature reaches the vicinity of the exhaust gas temperature (waveform W5). The exhaust gas temperature in the initial load heat soak is maintained at a fixed temperature (the lower limit value LL) (waveform W3). Therefore, the main steam temperature reaches the fixed temperature soon during the initial load heat soak. A response of the bore thermal stress to inflow of the main steam is slightly temporally delayed. Therefore, the bore thermal stress reaches a first peak Q1 at a point in time slightly after the time point t4 (waveform W6). However, thereafter, since heat gradually penetrates into the inside of a rotor member, the bore thermal stress is maintained at a value of approximately Q0 as residual thermal stress while gradually decreasing. During the initial load heat soak in this comparative example, the GT output value is retained at the second output value (waveform W1) and the IGV angle is retained at P2% (waveform W2). The GT output value of the second output value is an example of a predetermined value of the output value of the gas turbine 14.

Details of the initial load heat soak operation are explained.

The steam turbine used in the C/C power plant in the past is driven by the main steam having pressure near 10 MPa. However, the steam turbine of the C/C power plant in these days increases in a capacity according to an increase in an output and performance of the gas turbine. The steam turbine is driven by the main steam having high pressure near 15 MPa. As a result, the constituent members (e.g., the turbine rotor and the turbine casing) of the steam turbine are requested to have physical strength for withstanding high pressure. Therefore, the constituent members are configured by thick members.

As a mechanism of thermal stress occurrence, as explained above, the surface of the member in contact with the high-temperature main steam has a high temperature and the inside of the member not in contact with the high-temperature main steam is maintained at a low temperature and, as a result, the thermal stress occurs because of distortion due to thermal expansion. Therefore, as the member of the steam turbine increases in thickness, the thermal stress becomes a serious problem.

Therefore, when the steam turbine of the C/C power plant in these days is started, the initial load heat soak operation unnecessary in starting the small-capacity steam turbine is performed. Specifically, when the steam turbine reaches the initial load (in general, 3 to 5% of a rated 100% load is the initial load), operation for retaining the initial load for a predetermined initial load heat soak time (in general, a retaining time of 60 to 120 minutes) is performed. The initial load heat soak operation is operation in which a relatively small volume of the main steam continuously flows into the steam turbine. Therefore, it is possible to relax the problem of the thermal stress.

If the initial load heat soak operation is not performed and operation for causing a large volume of the main steam to flow into the steam turbine at a time (specifically, operation for increasing a load at a time after the steam turbine reaches the initial load), whereas the turbine member surface suddenly has a high temperature, the inside of the turbine member is maintained at a low temperature. Therefore, large thermal stress occurs. More accurately, although heat from the surface of the turbine member is gradually transferred to the inside of the turbine member and the inside of the turbine member gradually has a high temperature, the surface of the turbine member extremely quickly has a high temperature compared with the inside of the turbine member. As a result, the thermal stress of the steam turbine occurs in an instantaneous form and is likely to greatly reduce a service life (life) of the steam turbine.

The initial load heat soak operation is contrastive to such a start. In the initial load heat soak operation, a relatively small volume of the main steam is caused to flow into the steam turbine to gradually transfer heat to the member for a long time. Consequently, it is possible to relax occurrence of the thermal stress, delay progress of life consumption of the steam turbine with small thermal stress, and extend the service life of the steam turbine.

Therefore, a great theme in the start of the steam turbine is how long the initial load heat soak time is set. If the heat soak time is set to a long time, heat is slowly transferred to the member and the thermal stress is relaxed but a plant start time is delayed. Conversely, if the heat soak time is set to a short time, the thermal stress increases but the plant start time is reduced. Under such a background, the heat soak time (execution time of the heat soak) of the steam turbine is determined as a tradeoff between a service life based on economy and high-speed start expected for a commercial machine. The specific example of the heat soak time explained above has a setting width of 60 to 120 minutes. This is a result of considering a difference of a type model of the steam turbine and the element different for each power plant.

From the viewpoint of reducing the thermal reaction, it is effective to reduce a flow rate of the main steam. However, the plant start time is delayed. When operation with the flow rate of the main steam reduced to maintain the initial load is continued, the angle of the regulating valve is in an excessively small open state. A load more than necessary such as a pressure loss is applied to a valve body. Therefore, to reduce the thermal stress, it is a general practice to perform the initial load heat soak operation instead of reducing the main steam flow rate.

In the steam power plant in which a steam turbine having a capacity larger than the capacity of the C/C power plant is used, in general, low-speed heat soak and high-speed heat soak are performed in addition to the initial load heat soak. The description of this comparative example explains an example of the C/C power plant that performs the initial load heat soak.

[Time Points t5 to t7]

The initial load heat soak for 90 minutes is completed at a time point t5. In the plant control apparatus 2, the initial load heat soak completion signal D5 changes to ON at the time point t5. The SV value C1 of the exhaust gas temperature is switched from the setting value B4 to the setting value B2.

During a period of the time points t5 to t7, two startup processes for increasing the GT output value toward the rated 100% load are started at the time point t7.

In a first startup process, the IGV angles is reduced from P2% toward P1% (the minimum IGV angle) (waveform W2). According to the reduction of the IGV angle, the exhaust gas temperature suddenly starts to rise from the lower limit value LL at the time point t5 (waveform W3). Before the first startup process, to generate the low exhaust gas temperature of the lower limit value LL, the IGV angle is set to a large angle of P2% in an irregular "special operation mode" allowed for the relatively low GT output value (the second output value). In the first startup process, to increase the GT output value to an output region larger than the second output value, the IGV angle is reset to a small angle of P1% in a "normal operation mode".

In the first startup process, the IGV angle starts to decrease from P2% to P1% at the time point t5 and reaches P1% at a time point t6 between the time point t5 and the time point t7 (waveform W2). In general, a period of the time points t5 to t6 is approximately 3 minutes. The time of approximately 3 minutes is a time required for the IGV angle to decrease from P2% to P1% in terms of a mechanism of the IGVs 13b. According to the decrease in the IGV angle, the exhaust gas temperature rapidly rises from the lower limit value LL and reaches a high temperature of the setting value B2 at the time point t6 (waveform W3). Since the main steam temperature suddenly rises following the exhaust gas temperature (waveform W5), the surface of the rotor member in contact with the main steam has a high temperature and the member inside the rotor not in contact with the main steam is maintained at a low temperature. The bore thermal stress shows a tendency of increase again (waveform W6). A response of the bore thermal stress to the inflow of the main steam is temporally slightly delayed. Therefore, the bore thermal stress reaches a second peak Q2 at a point in time slightly after the time point t7 (waveform W6).

In a second startup process, the ST output value starts to increase from S1 (5%), which is the initial load, (waveform W7) and the bypass control valve 34 is fully closed. As a mechanism in which the bypass control valve 34 is fully closed, the angle of the regulating valve 33 increases together with the increase in the ST output value to fully close the bypass control valve 34. That is, the main steam A6 flowing through the bypass control valve 34 flows into the regulating valve 33 according to the increase in the angle of the regulating valve 33, whereby the bypass control valve 34 fully closes according to pressure control. The ST output value at a point in time when the bypass control valve 34 is fully closed is S2 illustrated in FIG. 5.

If the increase in the GT output value from the time point t7 occurs during a valve opening of the bypass control valve 34, since the increase in the GT output value causes an increase of the main steam A6, the angle of the bypass control valve 34 increases. In this case, there is an uneconomical problem in that a part of the main steam A6 does not contribute to power generation and is discarded to the condenser 32 through the bypass control valve 34. Further, when the angle of the bypass control valve 34 excessively increases, the bypass control valve 34 is likely to fully open. Therefore, it is necessary to fully close the bypass control valve 34 before the increase in the GT output value at the time point t7 by performing the second startup process.

[Time Points t7 to t8]

At the time point t7, the GT output value starts to increase from the second output value to the rated 100% output (waveform W1). The increase in the GT output value is controlled by the GT controller 56.

According to the increase in the GT output value, the exhaust gas temperature has a higher temperature than the setting value B2. However, a temperature change rate of the exhaust gas temperature in this case is gentle (waveform W3). This is because, since the rise in the exhaust gas temperature from the time point t7 is caused by gently increasing the angle of the fuel flow control valve 11 and increasing the GT output value, action of suddenly raising the exhaust gas temperature in the case of the decrease of the IGV angle from P2% to P1% does not affect.

Therefore, the rise in the main steam temperature from the time point t7 is also gentle like the exhaust gas temperature (waveform W5) and the bore thermal stress does not greatly increase (waveform W6). The bore thermal stress gradually decreases after reaching the second peak Q2 at the point in time slightly after the time point t7. The ST output value also increases because of the influence of an increase in a heat quantity (an increase in a flow rate or a rise in temperature) of the main steam A6 involved in the increase in the GT output value (waveform W7).

[Time Points t8 to t10]

At a time point t8, the IGV angle starts to increase from P1% to a maximum IGV angle (waveform W2). The exhaust gas temperature reaches a highest temperature (an isothermal temperature) at the time point t8 and, after maintaining the highest temperature until a time point t9, slightly drops (waveform W3).

At a time point t10, the GT output value reaches the rated 100% output (waveform W1) and the IGV angle reaches the maximum IGV angle (waveform W2). A response of the ST output value to inflow of the main steam is temporally slightly delayed. Therefore, the ST output value reaches the rated 100% output at a point in time slightly after the time point t10 (waveform W6).

First Embodiment

In a first embodiment, plant control for eliminating or relaxing the second peak Q2 of the bore thermal stress that occurs in the first comparative example is adopted. When thermal stress (bore thermal stress) occurs in the bore of the turbine rotor of the steam turbine 31, thermal stress also occurs on the surface of the turbine rotor of the steam turbine 31. The plant control adopted in the first embodiment eliminates or relaxes not only the former thermal stress (the bore thermal stress) but also the latter thermal stress.

As explained about the initial load heat soak in the first comparative example, large thermal stress greatly reduces the service life (life) of the steam turbine 31. Means for relaxing the thermal stress includes, for example, making a temperature change rate of the main steam gentle in a period in which the thermal stress could be a problem. Specifically, it is possible to make the temperature change rate of the main steam gentle by setting the period of the time points t5 to t6 longer. However, when the gentle temperature change rate is adopted, a long time is required until the power plant 1 reaches the rated 100% output. That is, the relaxing of the thermal stress (the extension of the service life) and the reduction of the plant start time is generally in a tradeoff relation. However, in the first embodiment, plant control capable of achieving both of these matters is adopted.

FIG. 1 is a schematic diagram illustrating a configuration of the power plant 1 in the first embodiment.

The plant control apparatus 2 illustrated in FIG. 1 includes a mismatch chart calculator 71, a NOT gate 72, an AND gate 73, a subtractor 74, a divider 75, a setter 76, a switcher 77, a setter 78 and a change rate limiter 79 instead of the mismatch chart calculator 64, the NOT gate 65 and the AND gate 66.

The mismatch chart calculator 71 acquires the measured value B3 of the metal temperature from the metal temperature sensor 35, calculates an initial load heat soak time E1 of the steam turbine 31 based on the measured value B3 of the metal temperature, and outputs the initial load heat soak time E1. The initial load heat soak time in the present embodiment is, for example, 90 minutes. The mismatch chart calculator 71 further outputs an initial load heat soak start signal E2 when the initial load heat soak operation of the steam turbine 31 is started.

The NOT gate 72 acquires the initial load heat soak start signal E2 from the mismatch chart calculator 71 and outputs a NOT operation result E3 of the initial load heat soak start signal E2. Specifically, the NOT operation result E3 is 0 when the initial load heat soak start signal E1 is ON (1). The NOT operation result E3 is 1 when the initial load heat soak start signal E1 is OFF (0).

The AND gate 73 acquires the switching signal D3 from the comparator 63 and acquires the NOT operation result E3 from the NOT gate 72. The AND gate 73 outputs a switching signal E4 indicating an AND operation result of the switching signal D3 and the NOT operation result E3.

The switcher 51 acquires the setting value B2 of the exhaust gas temperature in normal time from the function generator 41, acquires the setting value B4 of the exhaust gas temperature on startup from the lower limiter 45, and outputs the setting value C1 of the exhaust gas temperature according to a switching signal E3 output from the AND gate 73. The operation of the switcher 51 is explained below based on characteristics of the switching signal D3 and the switching signal E3.

An instruction of the switching signal D3 changes according to whether the measured value D1 (X) of the main steam temperature rises to the setting value D2 (Y) and reaches the setting value D2 (Y) (X≥Y). Therefore, the instruction of the switching signal E3 changes according to whether the measured value D1 of the main steam temperature reaches the setting value D2 and whether the initial load heat soak operation of the steam turbine 31 starts. As explained below with reference to FIG. 2, the initial load heat soak operation starts far later than when the measured value D1 of the main steam temperature reaches the setting value D2. Therefore, first, the explanation referring to FIG. 1 is limited to a situation before the initial load heat soak operation starts and, then, a situation after the initial load heat soak operation starts is also considered. Therefore, in the explanation referring to FIG. 1, the initial load heat soak start signal E2 is always OFF (0). The instruction of the switching signal E3 always coincides with the instruction of the switching signal D3.

Therefore, before the measured value D1 reaches the setting value D2, the switcher 51 maintains the setting value C1 at the setting value B2 of the exhaust gas temperature in normal time. On the other hand, when the measured value D1 reaches the setting value D2, the switcher 51 switches the setting value C1 to the setting value B4 of the exhaust gas temperature on startup. The setting value C1 is used as a setting value (an SV value) of PID control. In the following explanation, the setting value C1 is described as SV value as well.

The average value operator 52 acquires measured values C2 of the exhaust gas temperatures from the respective exhaust gas temperature sensors 14a in the gas turbine 14. The average value operator 52 calculates and outputs the average value C3 of these measured values C2. The average value C3 is used as a process value (a PV value) in the PID control. In the following explanation, the average value C3 is referred to as PV value as well.

The subtractor 53 acquires the SV value C1 of the exhaust gas temperature from the switcher 51 and acquires the PV value C3 of the exhaust gas temperature from the average value operator 52. The subtractor 53 subtracts the SV value C1 from the PV value C3 and outputs the deviation C4 between the SV value C1 of the exhaust gas temperature and the PV value C3.

Accurately, the subtractor 53 acquires a corrected SV value E8 obtained by correcting the SV value C1 rather than acquiring the SV value C1 and outputs the deviation C4 between the corrected SV value E8 and the PV value C3. However, as explained below, the corrected SV value E8 coincides with the SV value C1 before the start of the initial load heat soak operation. Therefore, the subtractor 53 operates to output the deviation C4 between the SV value C1 and the PV value C3.

The PID controller 54 acquires the deviation C4 from the subtractor 53 and performs PID control to bring the deviation C4 close to zero. The amount of manipulation (the MV value) C5 output from the PID controller 54 is the angle of the IGVs 13b (IGV angle). When the PID controller 54 changes the MV value C5, the IGV angle changes and the exhaust gas temperature changes. As a result, the PV value C3 of the exhaust gas temperature changes to approach the SV value C1.

However, when the IGV angle is excessively small, combustion in the combustor 12 is likely to be hindered. Therefore, the MV value C5 is input to the lower limiter 55 that retains the lower limit value LL (the minimum IGV angle) of the IGV angle. The lower limiter 55 outputs either the MV value C5 or the lower limit value LL, whichever is larger, as the corrected MV value C6.

The operation of the plant control apparatus 2 limited to the situation before the start of the initial load heat soak operation is explained above. Next, the operation of the plant control apparatus 2 is explained considering a situation after the start of the initial load heat soak operation as well.

The subtractor 74 acquires the setting value B2 of the exhaust gas temperature in normal time from the function generator 41 and acquires the setting value B4 of the exhaust gas temperature on startup from the lower limiter 45. The subtractor 53 subtracts the setting value B4 from the setting value B2 and outputs a deviation E5 between the setting value B2 and the setting value B4 (deviation E5=setting value B2−setting value B4).

The divider 75 acquires the deviation E5 from the subtractor 74 and acquires the initial load heat soak time E1 of the steam turbine 31 from the mismatch chart calculator 71. The divider 75 divides the deviation E5 by the initial load heat soak time E1 and outputs a division result E6 (division result E6=deviation E5÷initial load heat soak time E1).

As explained below, the plant control apparatus 2 in the present embodiment raises the exhaust gas temperature from the setting value B4 to the setting value B2 during the initial load heat soak. Therefore, the division result E6 is equivalent to average temperature rise speed (an average change rate) of the exhaust gas temperature during the initial load heat soak. The plant control apparatus 2 in the present embodiment operates such that temperature rise speed of the exhaust gas temperature during the heat soak approaches the average temperature rise speed. In the following explanation, the division result E6 is referred to as setting value of temperature rising speed (a change rate) of the exhaust gas temperature as well.

The setter 76 retains another setting value (1000° C./minute) of the change rate of the exhaust gas temperature. The switcher 77 acquires the setting value E6 of the change rate from the divider 75, acquires the other setting value (1000° C./minute) of the change rate from the setter 76, and outputs a limit value E7 of the change rate according to the initial load heat soak start signal E2 output from the mismatch chart calculator 71. Specifically, the switcher 77 outputs 1000° C./minute as the limit value E7 when the initial load heat soak start signal E2 is OFF and outputs the setting value E6 as the limit value E7 when the initial load heat soak start signal E2 is ON.

The setter 78 retains another limit value (−1000° C./minute) of the change rate. The change rate limiter 79 acquires the SV value C1 of the exhaust gas temperature from the switcher 51, acquires the limit value E7 of the change rate of the exhaust gas temperature from the switcher 77, and acquires the other limit value (−1000° C./minute) of the change rate of the exhaust gas temperature from the setter 78.

The change rate limiter 79 operates to limit the change rate of the SV value C1 between an upper limit value and a lower limit value. Specifically, when the change rate of the SV value C1 is present between the upper limit value and the lower limit value, the change rate limiter 79 directly outputs the SV value C1 as the corrected SV value E8. When the change rate of the SV value C1 is larger than the upper limit value, the change rate limiter 79 reduces the SV value C1 to set the change rate to the upper limit value and outputs the reduced SV value C1 as the corrected SV value E8. When the change rate of the SV value C1 is smaller than the upper limit value, the change rate limiter 79 increases the SV value C1 to set the change rate to the lower limit value and outputs the increased SV value C1 as the corrected SV value E8.

The change rate limiter 79 uses the limit value E7 as the upper limit value of the change rate and uses −1000° C./minute as the lower limit value of the change rate. Therefore, when the initial load heat soak start signal E2 is OFF, the upper limit value is 1000° C./minute and the lower limit value is −1000° C./minute. When the initial load heat soak start signal E2 is ON, the upper limit value is the setting value E6 and the lower limit value is −1000° C./minute.

The value of 1000° C./minute is a large value that is realistically impossible. The value of −1000° C./minute is a small value that is realistically impossible. Therefore, the corrected SV value E8 in the present embodiment changes from the SV value C1 based on the upper limit value (the setting value E6) only when the initial load heat soak start signal E2 is ON.

In the above explanation, the example is explained in which the SV value C1 of the exhaust gas temperature is switched from the setting value B2 to the setting value B4. However, at the start time of the initial load heat soak of the steam turbine 31, conversely, the SV value C1 of the exhaust gas temperature is switched from the setting value B4 to the setting value B2. Specifically, when the initial load heat soak starts, the initial load heat soak start signal E2 changes to 1 and the NOT operation result E3 changes to 0. Therefore, even when the instruction of the switching signal (NOT operation result) E3 is the setting value B4, the instruction of the switching signal E4 is the setting value B2. Therefore, when the initial load heat soak starts, the switcher 51 switches the SV value C1 from the setting value B4 to the setting value B2.

As a result, the IGV angle starts to decrease from P2% toward P1%. The exhaust gas temperature starts to rise from the setting value B4 toward the setting value B2. However, because the change rate limiter 79 operates to limit the change rate of the SV value C1 of the exhaust gas temperature to the setting value E6 or less, the exhaust gas temperature gently rises and the IGV angle gently decreases. Consequently, it is possible to prevent the main steam temperature from suddenly rising to cause large thermal stress in the steam turbine 31. The setting value E6 is obtained by dividing a difference between the setting value B2 and the setting value B4 by 90 minutes (the initial load heat soak time E1). Therefore, when the change rate of the SV value C1 of the exhaust gas temperature is limited to the setting value E6 or less, the exhaust gas temperature during the heat soak gently continuously rises from the setting value B4 to the setting value B2 in 90 minutes. To realize such a temperature rise, the IGV angle during the heat soak gently continuously decreases from P2% to P1% in 90 minutes. Details of such a limitation process are explained with reference to FIG. 2.

Figure 2:
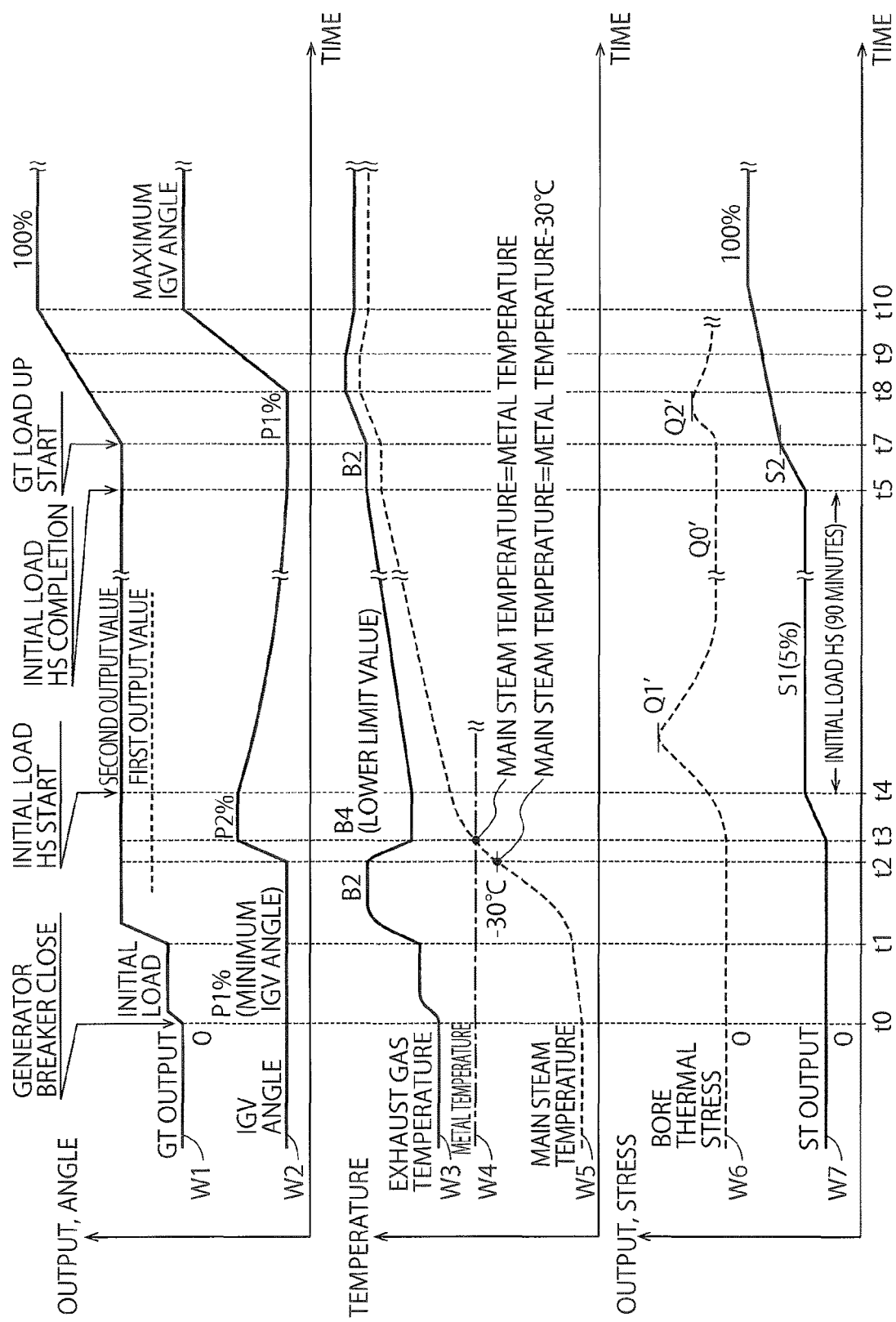
FIG. 2 is a graph for explaining the operation of the power plant in the first embodiment.

FIG. 2 is a graph for explaining the operation of the power plant 1 in the first embodiment

[Time Point t3]

First, the same process as the process in the first comparative example is performed from the time point t0 to the time point t3. Then, at the time point t3, the IGV angle reaches P2% and the exhaust gas temperature reaches the setting value B4 (waveforms W2 and W3). The main steam temperature reaches the metal temperature around the time point t3 (waveform W5). Therefore, the ST output controller 57 opens the regulating valve 33 at the time point t3 to start the steam injection of the steam turbine 31 and gradually increases the angle of the regulating valve 33. In this way, the steam turbine 31 is started and the ST output value starts to increase from zero toward S1 (5%) (waveform W7).

The setting value B4 of the exhaust gas temperature in the present embodiment is the lower limit value LL (waveform W3). Therefore, the main steam temperature at the time point t3 temporarily has a value near the metal temperature (waveform W5). Thereafter, the main steam temperature rises following the exhaust gas temperature and reaches a higher temperature than the metal temperature. Whereas the surface of the rotating shaft 15 (the turbine rotor) in contact with the high-temperature main steam has a high temperature, the inside of the rotating shaft 15 not in contact with the main steam is maintained at a low temperature. As a result, distortion due to thermal explanation of the rotating shaft 15 occurs. Bore thermal stress occurs in the steam turbine 31. After the time point t3, the bore thermal stress increases according to the rise in the main steam temperature (waveform W6).

[Time Point t4]

At time point t4, the ST output value reaches the 5% load (S1) (waveform W7). The initial load heat soak of the steam turbine 31 is started. The ST output value is retained at the 5% load for 90 minutes from time point t4. In the plant control apparatus 2, the initial load heat soak start signal E2 changes to ON at the time point t4. The SV value C1 of the exhaust gas temperature is switched from the setting value B4 to the setting value B2.

The IGV angle starts to decrease from P2% to P1% according to the initial load heat soak start signal E2 at time point t4 (waveform W2). Therefore, the exhaust gas temperature starts to rise from the setting value B4 (the lower limit value LL) to the setting value B2 (waveform W3). The main steam temperature continues to rise to reach the vicinity of the exhaust gas temperature (waveform W5).

When the initial load heat soak is started, the upper limit value of the change rate of the SV value C1 of the exhaust gas temperature is limited to the setting value E6 according to the initial load heat soak start signal E2. The setting value E6 is obtained by dividing a difference between the setting value B2 and the setting value B4 of the exhaust gas temperature by 90 minutes (the initial load heat soak time E1). Therefore, since the change rate of the SV value C1 during the initial load heat soak cannot exceed the upper limit value, the SV value C1 during the initial load heat soak gently increases from the setting value B4 to the setting value B2 in 90 minutes (waveform W3).

Therefore, whereas the IGV angle in the first comparative example suddenly decreases from P2% to P1% in approximately 5 to 10 minutes of the time points t5 to t6, the IGV angle in the present embodiment gently decreases from P2% to P1% in 90 minutes of the time points t4 to t5 (waveform W2). As a result, the main steam temperature also gently rises in 90 minutes (waveform W5). The bore thermal stress reaches a first peak Q1' at a point in time slightly after the time point t4 (waveform W6).

The first peak Q1' in the present embodiment is substantially equal to the first peak Q1 in the first comparative example or slightly larger than the first peak Q1 in the first comparative example. This is because the change rate of the main steam temperature in the present embodiment is slightly steep compared with the first comparative example. However, this difference does not seriously affect the service life (the life) of the steam turbine 31. In the present embodiment, heat gradually penetrates into the inside of the rotor member after the first peak Q1'. Therefore, the bore thermal stress is maintained at a value of approximately Q0' as residual thermal stress while gradually decreasing. During the initial load heat soak in the present embodiment, the GT output value is retained at the second output value (the waveform W1).

The IGV angle during the initial load heat soak in the present embodiment changes in a curved line shape rather than in a linear shape of the change of the exhaust gas temperature. This is because, since a relation between the IGV angle and the exhaust gas temperature is not a linear relation, if the change rate of the exhaust gas temperature is fixed, the change rate of the IGV angle is not fixed.

[Time Points t5 to t7]

At the time point t5, the initial load heat soak for 90 minutes is completed. Unlike the first comparative example, the IGV angle at the time point t5 is P1% and the exhaust gas temperature at the time point t5 is the setting value B2.

During the period of the time points t5 to t7, two startup processes for increasing the GT output value toward the rated 100% load are started at the time point t7. In the first comparative example, the first startup process for reducing the IGV angle from P2% to P1% and the second startup process for increasing the ST output value from S1 (5%), which is the initial load, is performed. In the present embodiment, only the second startup process is performed. This is because, in the present embodiment, a process equivalent to the first startup process has already been performed during the initial load heat soak.

Therefore, during the period of the time points t5 to t7 in the present embodiment, the exhaust gas temperature and the main steam temperature are retained constant (waveforms W3 and W5). As a result, a second peak Q2' of bore thermal stress appearing at a point in time slightly after the time point t7 is greatly decreases compared with the second peak Q2 in the first comparative example (waveform W6).

[Time Points t7 to t8]

At the time point t7, the GT output value starts to increase from the second output value toward the rated 100% output (waveform W1). The increase in the GT output value is controlled by the GT controller 56.

According to the increase in the GT output value, the exhaust gas temperature has a higher temperature than the setting value B2. However, a temperature change rate of the exhaust gas temperature in this case is gentle (waveform W3). This is because, since the rise in the exhaust gas temperature from the time point t7 is caused by gently increasing the angle of the fuel flow control valve 11 and increasing the GT output value, action of suddenly raising the exhaust gas temperature in the case of the decrease of the IGV angle from P2% to P1% in the first comparative example does not affect.

Therefore, the rise in the main steam temperature from the time point t7 is also gentle like the exhaust gas temperature (waveform W5) and the bore thermal stress does not greatly increase (waveform W6). The bore thermal stress gradually decreases after reaching the second peak Q2' at the point in time slightly after the time point t7. The ST output value also increases because of the influence of an increase in a heat quantity (an increase in a flow rate or a rise in temperature) of the main steam A6 involved in the increase in the GT output value (waveform W7).

[Time Points t8 to t10]

At a time point t8, the IGV angle starts to increase from P1% to the maximum IGV angle (waveform W2). The exhaust gas temperature reaches the highest temperature (the isothermal temperature) at the time point t8 and, after maintaining the highest temperature until the time point t9, slightly drops (waveform W3).

At a time point t10, the GT output value reaches the rated 100% output (waveform W1) and the IGV angle reaches the maximum IGV angle (waveform W2). A response of the ST output value to inflow of the main steam is temporally slightly delayed. Therefore, the ST output value reaches the rated 100% output at a point in time slightly after the time point t10 (waveform W6).

As explained above, in the present embodiment, the IGV angle is gently reduced from P2% to P1% during the initial load heat soak of the steam turbine 31. Therefore, according to the present embodiment, it is possible to reduce the second peak Q2' of the bore thermal stress. It is possible to extend the service life of the steam turbine 31. In the C/C power plant, in general, a frequency of performing the cold start is high and the bore thermal stress tends to be a problem. According to the present embodiment, it is possible to effectively extend the service life of the steam turbine 31 of the C/C power plant. As seen from the above, according to the present embodiment, it is possible to perform heat soak suitable for the C/C power plant.

[Details of the First Embodiment]

Next, details of the power plant 1 in the first embodiment are explained with reference to FIGS. 1 and 2.

In a starting method in the first comparative example, it is necessary to raise the main steam temperature at a "sudden change rate" in the startup process after the initial load heat soak. At this time, the large thermal stress (the second peak Q2) of the steam turbine occurs. Simply relaxing only the thermal stress can be realized by, for example, making the temperature change rate of the main steam after the initial load heat soak gentle. However, in this case, a long time is required until the power plant 1 has the rated 100% output. That is, in general, the thermal stress (the service life) and the plant startup time are in a tradeoff relation.

A first characteristic of the present embodiment is that, to eliminate or relax the thermal stress of the steam turbine 31 without preventing high-speed start of the power plant 1, the thermal stress is reduced while gradually raising the main steam temperature during the initial load heat soak for a relatively long time (e.g., 90 minutes). That is, the occurrence of the thermal stress is dispersed in a long period rather than concentrating the occurrence of the large thermal stress in a short period as in the first comparative example. As a result, the second peak Q2' of the thermal stress in the present embodiment is markedly smaller than the second peak Q2 in the first comparative example. Consequently, a load on the steam turbine 31 decreases. The service life (the life) of the steam turbine 31 is extended. In the present embodiment, although the occurrence of the thermal stress is prevented in this way, the plant start time is the same as the start time in the first comparative example.

A second characteristic of the present embodiment is that a change rate (temperature rising speed) of the exhaust gas temperature is determined based on the heat soak time E1. In the present embodiment, the change rate of the exhaust gas temperature is limited to the value obtained by dividing the difference between the setting value B2 and the setting value B4 by the heat soak time E1 to linearly raise the exhaust gas temperature. Consequently, the main steam temperature also substantially linearly rises. The occurrence of the thermal stress can be smoothed in 90 minutes. As a result, it is possible to further reduce the load on the steam turbine 31.

A third characteristic of the present embodiment is that the IGV angle is reduced to raise the main steam temperature. More in detail, during the initial load heat soak, the main steam temperature is raised by reducing the IGV angle while retaining the GT output value at the second output value. The third characteristic is explained in detail below.

The rise in the main steam temperature can be realized by the rise in the exhaust gas temperature. The rise in the exhaust gas temperature can be realized by 1) increasing the GT output value (i.e., increasing the fuel A1) or 2) reducing the IGV angle. In the following explanation, the former is referred to as method 1 and the latter is referred to as method 2.

When the method 1 is adopted, it is conceivable to increase the GT output value from the second output value during the initial load heat soak. In this case, for example, a problem occurs when the second output value is set to a maximum GT output value at which a temperature difference of the circulating water A8 between the outlet and the inlet of the condenser 32 does not exceed a predetermined value when the entire main steam A6 flows into the condenser 32 through the bypass control valve 34.

Specifically, in the startup process before the steam injection of the steam turbine 31, the entire main steam A6 flows into the condenser 32 through the bypass control valve 34. Therefore, a load on the condenser 32 is large and the temperature difference of the circulating water A8 between the outlet and the inlet of the condenser 32 increases. Therefore, if the second output value is set considering the temperature difference of the circulating water A8 as explained above, it is possible to control the GT output value such that the temperature difference of the circulating water A8 is smaller than a temperature difference (e.g., 7° C.) allowed from the viewpoint of environment preservation. A maximum value of the GT output value that can realize such control is the second output value in this case.

In this case, when the first method is adopted and the GT output value is increased from the second output value during the initial load heat soak, a flow rate of the main steam A6 generated from the drum 22 increases. This means that the temperature difference of the circulating water A8 deviates from the limitation of 7° C. and a problem in the environment preservation could occur.

However, to understand this mechanism, it is necessary consider the fact that a situation during the initial load heat soak and a situation before the steam injection of the steam turbine 31 are similar from the viewpoint of the load on the condenser 32. Specifically, since the initial load is a small load of 3 to 5%, the main steam A6 flowing into the steam turbine 31 during the initial load heat soak is a small amount. Therefore, during the initial load heat soak, most of the main steam A6 flows into the condenser 32 through the turbine bypass control valve 34. Therefore, the situation during the initial load heat soak and the situation before the steam injection of the steam turbine 31 are similar from the viewpoint that the load on the condenser 32 is large.

When the method 2 is adopted as in the present embodiment, the exhaust gas temperature is raised by reducing the IGV angle. Therefore, it is possible to raise the exhaust gas temperature while retaining the GT output value at the second output value during the initial load heat soak. Therefore, it is possible to avoid the problem of keeping the temperature difference of the circulating water A8 at 7° C. or lower in the case where the method 1 is adopted. Accurately, when the IGV angle is reduced while fixing the flow rate of the fuel A1, the GT output value can slightly increase. Therefore, the flow rate of the main steam A6 also can slightly increase. However, a large change that causes a problem of the temperature difference of the circulating water A8 does not occur.

In the present embodiment, when the IGV angle is increased, the flow rate of the compressed air A3 increases and the exhaust gas temperature drops. When the IGV angle is reduced, the flow rate of the compressed air A3 decreases and the exhaust gas temperature rises.

However, depending on a type model of the gas turbine 14, a definition of the IGV angle is opposite to the definition in the present embodiment. That is, depending on the type model of the gas turbine 14, the vanes of the IGVs 13b being in a "lying" state and the flow rate of the compressed air A3 increasing is represented as "the IGV angle decreases". The vanes of the IGVs 13b being in a "standing" state and the flow rate of the compressed air A3 decreasing is represented as "the IGV angle increases". The plant control in the present embodiment is applied to such a type model as well. When the plant control in the present embodiment is applied to such a type model, the lying of the vane is interpreted as an increase in the IGV angle and the standing of the vane is interpreted as a decrease in the IGV angle.

As explained above, in the starting method in the present embodiment, the IGV angle is reduced and the main steam temperature is gently raised during the heat soak operation of the steam turbine 31. Therefore, according to the present embodiment, it is possible to relax the thermal stress of the steam turbine 31. It is possible to realize startup with less load for the steam turbine 31 without uselessly extending the plant start time.

Second Embodiment

Figure 6:
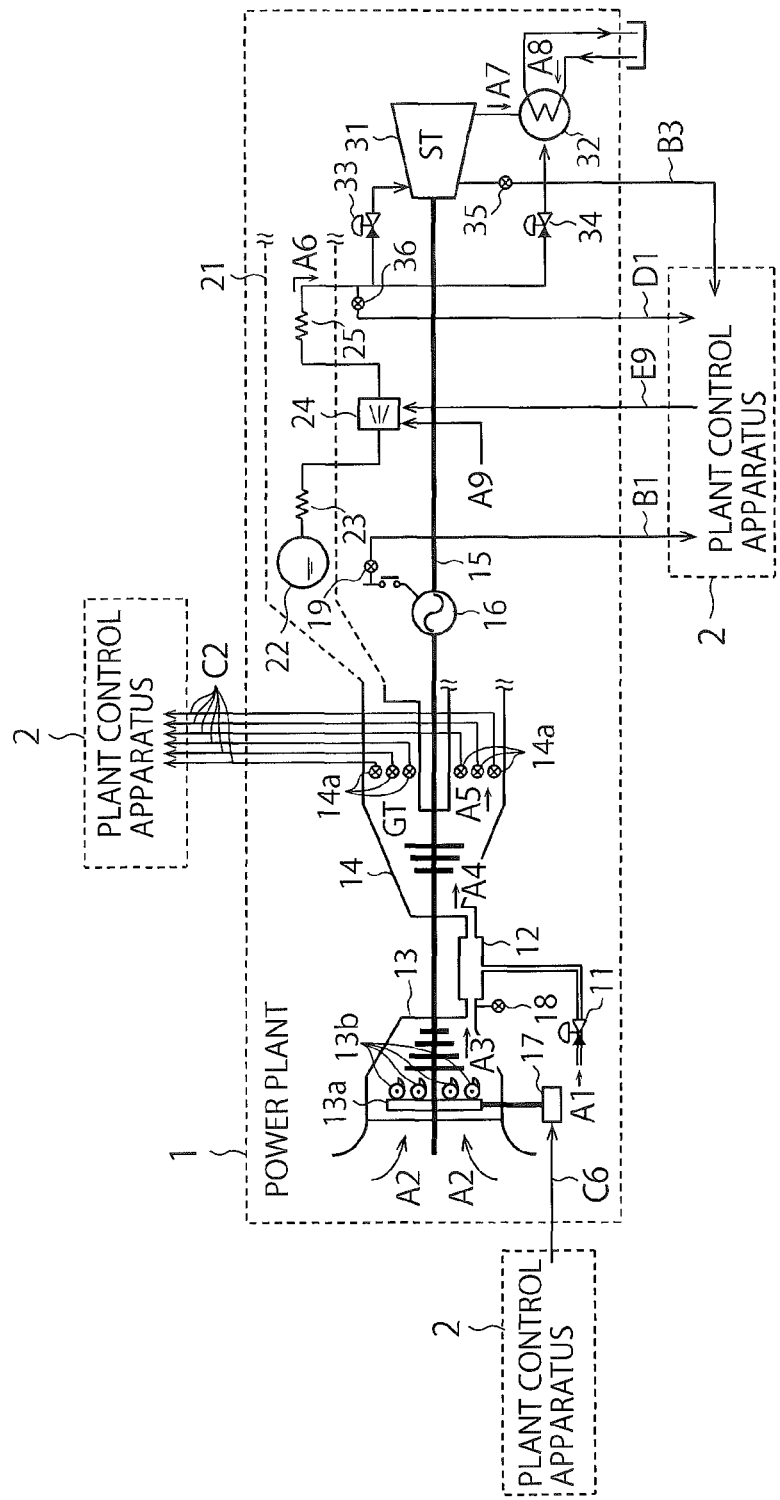
FIG. 6 is a schematic diagram illustrating a configuration of a power plant in a second embodiment.

FIG. 6 is a schematic diagram illustrating a configuration of the power plant 1 in a second embodiment.

The power plant 1 illustrated in FIG. 6 includes a temperature reduction device 24 and a superheater 25 in addition to the components illustrated in FIG. 1. In the following explanation, the superheater 23 is referred to as "primary superheater 23" as well and the superheater 25 is referred to as "secondary superheater 25" as well. The primary superheater 23, the temperature reduction device 24 and the secondary superheater 25 are components of the heat recovery steam generator 21.

The primary superheater 23 receives saturated steam from the drum 22 and superheats the saturated steam using heat of the exhaust gas A5 to generate primary steam from the saturated steam. The temperature reduction device 24 receives the primary steam from the primary superheater 23 and injects cooling water A9 into the primary steam to cool the primary steam. The secondary superheater 25 receives the primary steam from the temperature reduction device 24 and superheats the primary steam using the heat of the exhaust gas A5 to generate secondary steam from the primary steam. The heat recovery steam generator 21 discharges the secondary steam as the main steam A6.

In FIG. 6, plant control apparatuses 2 are illustrated in three parts. These plant control apparatuses 2 represent the same one plant control apparatus 2. The plant control apparatus 2 illustrated in FIG. 6 includes the same components as the components of the plant control apparatus 2 illustrated in FIG. 1. In addition, the plant control apparatus 2 illustrated in FIG. 6 outputs a signal E9 for controlling opening and closing and an angle of a valve for the cooling water A9 (a cooling water flow control valve). When the valve is opened according to the signal E9, the cooling water A9 passing through the valve is injected into the primary steam in the temperature reduction device 24.

A plant control method in the second embodiment can further relax the first peak Q1' (see FIG. 2) of the bore thermal stress that occurs in the plant control method in the first embodiment. Details of the plant control method in the second embodiment are explained below.

In the first embodiment, the IGV angle is controlled to raise the exhaust gas temperature from the setting value B4 to the setting value B2 in 90 minutes of the initial load heat soak. In this case, B2 is temperature before the steam turbine 31 is started (the steam injection of the steam turbine 31 is performed) and is a relatively high temperature for facilitating early main steam generation.

However, the exhaust gas temperature does not always have to be raised to the high temperature B2 during the initial load heat soak. A plant control method in the second embodiment is equivalent to an example of a method of raising the exhaust gas temperature. In the second embodiment, the IGV angle is controlled to raise the exhaust gas temperature from the setting value B4 to a setting value B5 in 90 minutes of the initial load heat soak. The setting value B5 in the second embodiment is lower than the setting temperature B2 (B5<B2).

The plant control apparatus 2 acquires the measured value D1 of the main steam temperature, that is, the temperature of the main steam (secondary steam) A6 from the main steam temperature sensor 36 and compares the measured value D1 and a threshold. The threshold is, for example, 560° C. The plant control apparatus 2 outputs a signal E9 to close a valve for the cooling water A9 when the measured value D1 is smaller than the threshold and open the valve for the cooling water A9 when the measured value D1 is equal to or larger than the threshold. As a result, the temperature reduction device 24 injects the cooling water A9 into the primary steam when the measured value D1 is equal to or larger than the threshold. The threshold is an example of a first temperature.

The setting value B5 in the second embodiment is determined based on the threshold. Specifically, the setting value B5 is set to the same value as the threshold. Therefore, the setting value B5 is, for example, 560° C. The setting value B5 is an example of a second temperature.

Details of the temperature reduction device 24 are explained below.

In the power plant 1 without the temperature reduction device 24, when the initial load heat soak is completed and the exhaust gas temperature is B2, the temperature of the main steam A6 also gradually approaches B2. Therefore, the heat recovery steam generator 21 needs to be manufactured from an expensive material that can withstand the main steam A6 having the high temperature B2.

On the other hand, the power plant 1 in the present embodiment injects the cooling water A9 with the temperature reduction device 24 to lower the temperature of the main steam A6 to B5 or less. This is temperature reduction spray control for the main steam A6 by the cooling water A9. A temperature setting value (an SV value) of the control is B5 [° C.]. Accurately, B5 is not a setting value for the temperature reduction spray control and is a setting value of the exhaust gas temperature in completion time of the initial load heat soak. However, in the present embodiment, the setting values have the same value (540° C.). Therefore, B5 is referred to as temperature setting value for the temperature reduction spray control as well.

The plant control apparatus 2 adjusts an angle of the cooling water flow control valve and injects the cooling water A9 to reduce the temperature of the main steam A6 to B5 or less. Consequently, although plant thermal efficiency (performance) is slightly sacrificed, the heat recovery steam generator 21 does not need to have heat resistance against the high temperature of B2 and only has to have heat resistance against the lower temperature of B5. Therefore, it is possible to reduce manufacturing cost of the heat recovery steam generator 21.

In the power plant in these days, economy and environment protection are oriented. In the latest gas turbine, performance improvement by an increase in a turbine inlet temperature (a combustion temperature) is marked. Therefore, the exhaust gas temperature is also higher in all load bands than the exhaust gas temperature in the past. In such a trend, sufficient economical rationality is present in the cooling by the temperature reduction device 24 as in the present embodiment.

An advantage of the temperature reduction device 24 is that, for example, even if the exhaust gas temperature is a high temperature equal to or higher than B5, a temperature rise of the temperature of the main steam A6 is prevented with B5 set as an upper limit. When focusing on the fact that what directly causes the thermal stress of the turbine rotor is a rise in the temperature of the main steam A6 and is not a rise in the exhaust gas temperature, it is useless to raise the exhaust gas temperature to B2 as in the first embodiment when the temperature reduction device 24 is set as in the second embodiment. That is, it is sufficient to raise the exhaust gas temperature in the present embodiment to B5. With such a temperature rise, it is possible to reduce a rising rate of the exhaust gas temperature. Such a rising rate is explained below.

Figure 7:
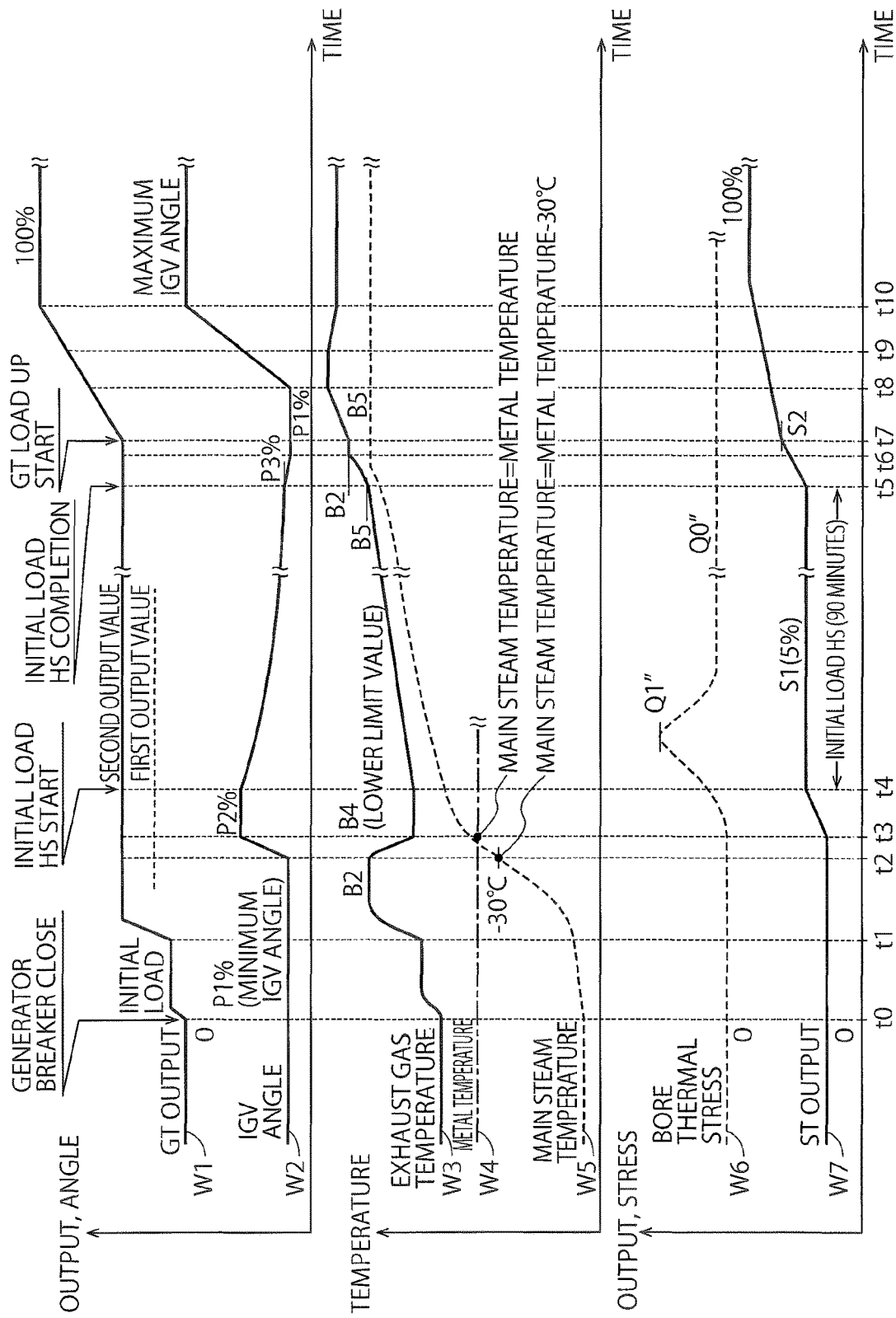
FIG. 7 is a graph for explaining the operation of the power plant in the second embodiment.

FIG. 7 is a graph for explaining the operation of the power plant 1 according to the second embodiment.

[Time Point t2]

First, at the time point t0 to the time point t2, a process same as the process in the first embodiment is performed. As a result, the setting value B2 of the IGV exhaust gas temperature control at the time point t1 to the time point t2 is maintained at a high temperature. The IGV angle is maintained at P1%, which is the minimum IGV angle.

In this startup initial stage, the exhaust gas temperature is desirably a high temperature within an allowable range such that steam can be generated from the drum 22 as early as possible. Therefore, at a point in time of initial load heat soak completion [time point t5] in a later process, the exhaust gas temperature is raised to only the low temperature B5. However, at a stage of the time point t2, the heat recovery steam generator 21 is energetically heated at the high temperature B2 as in the first embodiment. Such heating is possible because the main steam temperature is still a low temperature at the stage of the time point t2.

[Time Point t3]

Subsequently, the same process as the process in the first embodiment is performed at the time point t2 to the time point t3. At the time point t3, the IGV angle reaches P2% and the exhaust gas temperature drops to the setting value B4 (waveforms W2 and W3). Further, the main steam temperature reaches the metal temperature around the time point t3 (waveform W5). Therefore, at the time point t3, the regulating valve 33 is opened to start the steam injection of the steam turbine 31 and the angle of the regulating valve 33 is gradually increased. In this way, the steam turbine 31 is started and the ST output value starts to increase from zero to S1 (5%) (waveform W7).

In the present embodiment, since the cold start is performed, the main steam temperature (=metal temperature) is sufficiently lower than the temperature setting value B5 of the main steam temperature reduction spray control at this stage. Injection of the cooling water A9 is not started yet.

As in the first embodiment, the main steam temperature rises following the exhaust gas temperature. The bore thermal stress occurs in the steam turbine 31 according to the rise in the main steam temperature. After the time point t3, the bore thermal stress increases according to the rise in the main steam temperature (waveform W6).

[Time Point t4]

At the time point t4, the ST output value reaches the 5% load (S1) (waveform W7). The initial load heat soak of the steam turbine 31 is started. The ST output value is retained at the 5% load for 90 minutes from the time point t4. When the initial load heat soak is started at the time point t4, the setting value of the exhaust gas temperature control is switched from the setting value B4 to the setting value B5. This operation is control different from the control in the first embodiment. Whereas the setting value is switched from the setting value B4 to the setting value B2 in the first embodiment, the setting value is switched from the setting value B4 to the setting value B5 in the second embodiment. Such switching can be realized when, for example, the switcher 51 illustrated in FIG. 1 includes, as input terminals, a terminal for B5 in addition for a terminal for B2 and a terminal for B4.

The IGV angle starts to decrease from P2% to P3% at the time point t4 according to the initial load heat soak start (waveform W2). Therefore, the exhaust gas temperature starts to rise from the setting value B4 toward the setting value B2 (waveform W3). The main steam temperature rises following the exhaust gas temperature (waveform W5).

A rising rate of the exhaust gas temperature during the initial load heat soak in the present embodiment is compared with the first embodiment. The SV value C1 of the exhaust gas temperature control in the first embodiment increases from the setting value B4 to the setting value B2 in 90 minutes of the initial load heat soak. Therefore, the rising rate of the exhaust gas temperature in the first embodiment is $(B2-B4) \div 90$ [° C./minute]. The rising rate of the exhaust gas temperature in the second embodiment is $(B5-B4) \div 90$ [° C./minute]. As explained above, a relation of B5<B2 holds between B2 and B5. Therefore, the rising rate in the second embodiment is smaller than the rising rate in the first embodiment.

According to the rise in the exhaust gas temperature, the main steam temperature also gently rises in 90 minutes (waveform W5). The bore thermal stress reaches a first peak Q1″ at a point in time slightly after the time point t4 (waveform W6). In the second embodiment, since the rise in the exhaust gas temperature is gentle compared with the first embodiment, the rise in the main steam temperature is also gentle compared with the first embodiment. As a result, the first peak Q1″ in the second embodiment is small with respect to the first peak Q1′ in the first embodiment.

In the second embodiment, when the injection of the cooling water A9 by the main steam temperature reduction spray control is started, the main steam temperature is retained constant at B5. The bore thermal stress of the steam turbine 31 does not increase any more. This is referred to again at the time points t5 to t6 explained below. If the plant control method in the first embodiment is applied to the power plant 1 in the second embodiment including the temperature reduction device 24, the exhaust gas temperature rises from B4 toward B2 rather than to B5 during the initial load heat soak (B4<B5<B2). However, in a period in which the exhaust gas temperature rises from B5 to B2, the main steam temperature is already retained at B5. Therefore, it is meaningless to gently raise the exhaust gas temperature in this band considering the bore thermal stress. Rather, a period when the exhaust gas temperature should be gently raised considering the bore thermal stress is a period when the exhaust gas temperature rises from B4 to B5. Therefore, in the second embodiment, the exhaust gas temperature is raised as explained above.

As in the first embodiment, the IGV angle during the initial load heat soak in the present embodiment changes in a curved line shape rather than the linear shape of the change in the exhaust gas temperature. This is because, since the relation between the IGV angle and the exhaust gas temperature is not a linear relation, when the change rate of the exhaust gas temperature is fixed, the change rate of the IGV angle is not fixed.

[Time Points t5 to t7]

At the time point t5, the initial load heat soak for 90 minutes is completed. Unlike the first embodiment, the IGV angle at the time point t5 is P3% and the exhaust gas temperature at the time point t5 is the setting value B5. The plant control apparatus 2 in the present embodiment reduces the IGV angle from P2% to P3% during the initial load heat soak to set the exhaust gas temperature at the time point t5 to the setting value B5 (P2%>P3%). Since a magnitude relation between the setting value B5 and the setting value B2 is B5<B2, the magnitude relation of the IGV angle is P3%>P1%. P3% is an example of a third angle.

In the period of the time points t5 to t7, two startup processes for increasing the GT output value toward the rated 100% load are started at the time point t7. In the second embodiment, based on the same reason as in the case of the first comparative example, the first startup process for reducing the IGV angle from P3% to P1% and the second startup process for increasing the ST output value from S1 (5%), which is the initial load, are performed.

Therefore, in the period of the time points t5 to t6 in the present embodiment, as in the first comparative example, the exhaust gas temperature rises. Specifically, the exhaust gas temperature starts to rise from B5 at the time point t5 and reaches B2 at the time point t6 (waveform W3). On the other hand, the main steam temperature following the exhaust gas temperature reaches B5 at a point in time slightly after the time point t5 (waveform W5).

When the main steam temperature reaches B5, injection of the cooling water A9 is started by the main steam temperature reduction spray control. The main steam temperature after that is retained at a fixed value (B5) even if the exhaust gas temperature rises. In the present embodiment, this point is different from the first comparative example.

The bore thermal stress of the steam turbine 31 is due to the rise in the main steam temperature. Therefore, after the main steam temperature is retained at B5, even if the exhaust gas temperature steeply rises, the bore thermal stress of the steam turbine 31 does not increase. Therefore, whereas the bore thermal stress starts a rise at the time point t5 in the first comparative example, the bore thermal stress in the present embodiment is retained at approximately Q0″, which is the residual thermal stress.

[Time Points t7 to t8]

At the time point t7, the GT output value starts to rise from the second output value toward the rated 100% output (waveform W1). The ST output value also rises because of the influence of an increase in a heat quantity (an increase in a flow rate) of the main steam A6 involved in the increase in the GT output value (waveform W7).

According to the increase in the GT output value, the exhaust gas temperature is higher than the setting value B2. However, as explained above, since the main steam temperature is retained at B5, the bore thermal stress of the steam turbine 31 is retained at approximately Q0″, which is the residual thermal stress. In the first embodiment, the bore thermal stress shows the second peak Q2′ at the point in time slightly after the time point t7. In the second embodiment, a second peak equivalent to the second peak Q2′ does not occur. As seen from the above, according to the second embodiment, it is possible to prevent occurrence of a second peak of the bore thermal stress.

Finally, details of the second embodiment are complementarily explained.

In the second embodiment, the steam generated by the energy of the fuel A1 is cooled by the cooling water A9. Therefore, plant thermal efficiency (performance) is sanctified. However, in a latest model gas turbine, it should be noted that an increase in a turbine inlet temperature (a combustion temperature) is oriented. In such a latest model gas turbine, even if the exhaust gas temperature is the setting value B2, which is the exhaust gas temperature during the low-load operation, the exhaust gas temperature shows a high-temperature characteristic not inferior to a high-temperature characteristic of a highest exhaust gas temperature (in general, the high-temperature characteristic is exerted in an intermediate load band rather than in the rated 100% base load). In the power plant 1 including such a latest model gas turbine, even if the cooling water A9 is injected based on B5, which is the setting value of the lower temperature than B2, deterioration in the plant thermal efficiency is little. For example, when the latest model gas turbine, B2 of which is near 600° C., and the main steam temperature reduction spray control, B5 of which is 560° C., are combined, it is possible to keep efficiency deterioration within an allowable range while relaxing the thermal stress of the steam turbine 31.

On the other hand, depending on a type of the gas turbine 14, in some case, the gas turbine 14 does not have such characteristics and the setting value B2 during the low-load operation is a low temperature. In a commercial power plant that pursues economy, it is unallowable to apply the second embodiment to the power plant 1 including the gas turbine 14 and adopt B5 of a lower temperature than the setting value B2. In such a case, as a more practical plant control method, it is conceivable to, for example, switch the temperature setting value of the main steam temperature reduction spray control in two stages. For example, the temperature setting value B5 of a low temperature is applied only during the initial load heat soak and a temperature setting value B5' of a high temperature is applied in the other periods. When such a method is adopted, it is desired not to excessively increase the thermal stress of the steam turbine 31. Focusing on this point, for example, a method in a third embodiment may be adopted.

Third Embodiment

The power plant 1 in a third embodiment is explained below with reference to FIG. 6. In the following explanation, please refer to FIG. 2 about the components of the plant control apparatus 2 and the reference numerals and signs concerning the components and refer to FIG. 7 about the operation of the power plant 1 and the reference numerals and signs concerning the operation.

The plant control apparatus 2 in the second embodiment reduces the IGV angle from P2% to P3% (P2%>P3%) during the initial load heat soak to set the exhaust gas temperature at the time point t5 to the setting value B5. The setting value B5 is, for example, 560° C. Since a magnitude relation between the setting value B5 and the setting value B2 is B5<B2, a magnitude relation of the IGV angle is P3%>P1%.

The plant control apparatus 2 in the third embodiment reduces the IGV angle from P2% to P4% (P2%>P4%) during the initial load heat soak to set the exhaust gas temperature at the time point t5 to a setting value B6. The setting value B6 is, for example, 540° C. Since a magnitude relation between the setting value B6 and the setting value B2 is B6<B2, a magnitude relation of the IGV angle is P4%>P1%. P4 is an example of the third angle like P3%.

The power plant 1 in the third embodiment may or may not include the temperature reduction device 24 and the superheater 25.

Details of the setting value B6 are explained below.

B6 in the present embodiment is determined based on the metal temperature of the steam turbine 31 in the case where the start of the steam turbine 31 is defined as the hot start in the mismatch chart. Specifically, B6 is determined by adding an appropriate margin to the metal temperature. The metal temperature is an example of a third temperature. B6 is an example of a fourth temperature and is, for example, 540° C. B6 in the present embodiment is determined by adding 40° C., which is a margin of a fixed value, to 500° C.

As start modes of the steam turbine 31, there are cold start, warm start, hot start, and the like. These are start modes defined according to the metal temperature of the steam turbine 31. In general, the cold start is an operation mode defined for a temperature band in which the metal temperature is approximately 300° C. or lower. The warm start is a start mode defined for a band in which an inner surface metal temperature generally exceeds approximately 300° C. (however, the hot start is performed at 500° C. or higher).

The plant control method in the present embodiment is applied to the cold start having a long initial load heat soak time (90 minutes) on a start process like the plant control methods in the first and second embodiments. However, in the present embodiment, focusing on a thermal stress behavior of the hot start, content of the hot start is incorporated in a plant control method during the cold start.

The mismatch chart calculator 71 includes a mismatch chart. A specific example of the mismatch chart is generally known. For example, an initial load retaining time (an initial load heat soak time) is specified by the mismatch chart. According to an example of the mismatch chart, the initial load heat soak time decreases as the metal temperature of the steam turbine 31 is higher. The initial load heat soak time is zero in the hot start. In this case, it is unnecessary to carry out the initial load heat soak on the start process of the hot start.

The metal temperature defined and classified into the hot start is different for each model type of the steam turbine 31. In a mismatch chart of plant control in these days, as explained above, it is a general practice to define, as the hot start, a high-temperature band in which the metal temperature measured before the steam injection of the steam turbine 31 is near 500° C. or 500° C. or higher. Therefore, in the present embodiment, the metal temperature of 500° C. or higher immediately before the steam injection is defined as the hot start. However, other definitions may be adopted.

In general, the initial load heat soak operation is performed for the purpose of causing a small amount of the main steam A6 to flow into the steam turbine 31 and gradually transferring heat from the main steam A6 to the turbine rotor for a long time to relax occurrence of thermal stress. In the host start, since the metal temperature retains the high temperature of 500° C. or higher, even if the main steam A6 having a higher temperature than the metal temperature flows into the steam turbine 31, serious thermal stress does not occur in the turbine rotor. Therefore, in the hot start, the initial load heat soak operation is unnecessary.

The third embodiment focuses on this fact. Specifically, a startup process is carried out in which the metal temperature of the steam turbine 31 rises to 500° C. at the point in time of the initial load heat soak completion (t5). In the startup process, a state of the steam turbine 31, which is in a state of the cold start at a start point in time of the steam injection, changes to a state of the hot start at the point in time of the initial load heat soak completion. This can be expressed that a pseudo hot start is realized. In the startup process after the initial load heat soak, the exhaust gas temperature and the main steam temperature rise. However, since the high metal temperature of 500° C. is retained as in the hot start, even if high-temperature main steam flows into the steam turbine 31, excessively large thermal stress does not occur in the turbine rotor.

In the present embodiment, the IGV angle is controlled to raise the exhaust gas temperature to the setting value B6 in 90 minutes of the initial load heat soak to realize the pseudo hot start. In the present embodiment, the setting value B6 is set to 540° C. by adding, for example, a margin of 40° C. to 500° C., which is the metal temperature of the hot start.

This temperature of 40° C. is set considering a temperature deviation between the exhaust gas temperature and the main steam temperature and a temperature deviation between the main steam temperature and the metal temperature. That is, when the exhaust gas temperature rises, the main steam temperature rises following the exhaust gas temperature. The metal temperature rises following the main steam temperature. Therefore, during these rises, the main steam temperature is slightly lower than the exhaust gas temperature and the metal temperature is slightly lower than the main steam temperature. In other words, the main steam temperature rises later than the exhaust gas temperature and the metal temperature rises later than the main steam temperature. Please note that FIGS. 2, 5 and 7 illustrate only the metal temperature (W4) before the steam injection of the steam turbine 31.

The delay of the rise in the main steam temperature from the rise in the exhaust gas temperature and the delay in the rise of the metal temperature from the rise in the main steam temperature are peculiar values for each power plant 1. However, the delays are different values in a period of time on the startup process (e.g., an initial stage or near a completion of the initial load heat soak). In general, the delays are evaluated as 20° C. to 60° C. Therefore, in the present embodiment, assuming that the delay of the rise in the metal temperature from the rise in the exhaust gas temperature is 40° C., the margin is set to 40° C. The delay may be accurately specified based on actual machine trial operation or the like of the steam turbine 31. The delay specified in this way may be added to 500° C. to determine the setting value B6.

A third embodiment and a second embodiment are compared.

In these embodiments, the case in which the setting value B5 is set to 560° C. and the case in which the setting value B6 is set to 540° C. are explained. The values of 560° C. and 540° C. are only illustrations. However, a relation of B5>B6 is considered to hold in many cases. A reason for this is as explained below.

In a heat balance plan (a heat balance) of an appropriate commercial combined cycle power plant, the setting value B5 of the main steam temperature reduction spray control is planned at a higher temperature than the metal temperature (e.g., 500° C.) defined as the hot start. This is because, in general, the setting value B5 of the main steam temperature reduction spray control serves as the upper limit value and practically determines the main steam temperature. If the setting value B5 is lower than 500° C., neither the main steam temperature nor the metal temperature exceeds 500° C. The definition of the hot start is considered to have no meaning. Therefore, the setting value B5 is set to a higher temperature than 500° C. It is considered that the setting value B6 is generally a lower temperature than the setting value B5 even if a margin (e.g., 40° C.) is added to 500° C.

As explained above, in the plant control methods in the first to third embodiments, the IGV angle is reduced during the heat soak operation of the steam turbine 31 and the main steam temperature is raised at a gentle temperature change rate. Therefore, according to these embodiments, it is possible to relax the thermal stress of the steam turbine 31. It is possible to adopt a starting method with less load on the steam turbine 31 without sacrificing the plant start time.

While certain embodiments have been described, these embodiments have been presented by way of example only, and are not intended to limit the scope of the inventions. Indeed, the novel apparatuses, methods and systems described herein may be embodied in a variety of other forms; furthermore, various omissions, substitutions and changes in the form of the apparatuses, methods and systems described herein may be made without departing from the spirit of the inventions. The accompanying claims and their equivalents are intended to cover such forms or modifications as would fall within the scope and spirit of the inventions.

The invention claimed is:

1. A plant control apparatus, the apparatus comprising:
a first output controller configured to control an output value of a gas turbine driven by gas generated by a combustor burning fuel with oxygen introduced from an inlet guide vane;
a second output controller configured to control an output value of a steam turbine driven by steam generated by a heat recovery steam generator using heat of an exhaust gas from the gas turbine, the second output controller being configured to maintain the output value of the steam turbine at a constant, predetermined value during a predetermined period; and
an angle controller configured to (1) control an angle of the inlet guide vane before a start of the steam turbine to be a first angle, (2) control the angle of the inlet guide vane after the start of the steam turbine to be a second angle larger than the first angle, and (3) reduce the angle of the inlet guide vane from the second angle to a third angle larger than or equal to the first angle but smaller than the second angle, during the predetermined period during which the output value of the steam turbine is being maintained at the constant, predetermined value.

2. The apparatus of claim 1, wherein the angle controller is further configured to continuously reduce the angle of the inlet guide vane from the second angle to the third angle during the predetermined period such that the angle of the inlet guide vane is the second angle at a start time of the predetermined period and the angle of the inlet guide vane is the third angle at a completion time of the predetermined period.

3. The apparatus of claim 1, wherein the angle controller is further configured to calculate a setting value of a temperature rising speed of a temperature of the exhaust gas during the predetermined period, and control the angle of the inlet guide vane based on the setting value of the temperature rising speed.

4. The apparatus of claim 3, wherein the angle controller is further configured to calculate the setting value of the temperature rising speed by dividing a difference between a setting value of the temperature of the exhaust gas at a start time of the predetermined period and a setting value of the temperature of the exhaust gas at a completion time of the predetermined period by the predetermined period.

5. The apparatus of claim 4, wherein the angle controller is further configured to calculate the setting value of the temperature rising speed using
the setting value of the temperature of the exhaust gas at the start time of the predetermined period, which is a setting value of the temperature of the exhaust gas at a time when the angle of the inlet guide vane is the second angle, and
the setting value of the temperature of the exhaust gas at the completion time of the predetermined period, which is a setting value of the temperature of the exhaust gas at a time when the angle of the inlet guide vane is the first angle or the third angle.

6. The apparatus of claim 1, wherein the first output controller is further configured to maintain the output value of the gas turbine at a specified value during the predetermined period.

7. The apparatus of claim 1, wherein the angle controller is configured to reduce the angle of the inlet guide vane during the predetermined period, which is a period for performing heat soak of the steam turbine.

8. The apparatus of claim 1, wherein
the angle controller is further configured to reduce the angle of the inlet guide vane from the second angle to the third angle during the predetermined period such that the temperature of the exhaust gas at a completion time of the predetermined period is a second temperature determined based on a first temperature, the first temperature being used to compare with a temperature of secondary steam generated by a secondary superheater.

9. The apparatus of claim 8, wherein
the angle controller is further configured to reduce the angle of the inlet guide vane from the second angle to the third angle during the predetermined period such that the temperature of the exhaust gas at the completion time of the predetermined period is the first temperature.

10. The apparatus of claim 1, wherein the angle controller is further configured to reduce the angle of the inlet guide vane from the second angle to the third angle during the predetermined period such that a metal temperature of the steam turbine at the completion time of the predetermined period is a third temperature and a temperature of the exhaust gas at the completion time of the predetermined period is a fourth temperature determined based on the third temperature.

11. The apparatus of claim 10, wherein the angle controller is further configured to reduce the angle of the inlet guide value such that the third temperature is the metal temperature and a start of the steam turbine is defined as a hot start in a mismatch chart.

12. The apparatus of claim 10, wherein the angle controller is further configured to reduce the angle of the inlet guide value such that the fourth temperature is higher than the third temperature.

13. A plant control method for controlling a power plant comprising: that includes a combustor configured to burn fuel with oxygen introduced from an inlet guide vane to generate gas, a gas turbine driven by the gas from the combustor, a heat recovery steam generator configured to generate steam using heat of an exhaust gas from the gas turbine, and a steam turbine driven by the steam from the heat recovery steam generator, the method comprising:
controlling an output value of the gas turbine;
controlling an output value of the steam turbine to maintain the output value of the steam turbine at a constant, predetermined value during a predetermined period;
controlling an angle of the inlet guide vane before a start of the steam turbine to be a first angle;
controlling the angle of the inlet guide vane after the start of the steam turbine to be a second angle larger than the first angle; and
reducing the angle of the inlet guide vane from the second angle to a third angle larger than or equal to the first angle but smaller than the second angle during the predetermined period during which the output value of the steam turbine is being maintained at the constant, predetermined value.

14. A power plant, comprising:
a combustor configured to burn fuel with oxygen introduced from an inlet guide vane to generate gas;
a gas turbine driven by the gas from the combustor;
a heat recovery steam generator configured to generate steam using heat of an exhaust gas from the gas turbine;
a steam turbine driven by the steam from the heat recovery steam generator;
a first output controller configured to control an output value of the gas turbine;
a second output controller configured to control an output value of the steam turbine, the second output controller being configured to maintain the output value of the steam turbine at a constant, predetermined value during a predetermined period; and
an angle controller configured to (1) control an angle of the inlet guide vane before a start of the steam turbine to be a first angle, (2) control the angle of the inlet guide vane after the start of the steam turbine to be a second angle larger than the first angle, and (3) reduce the angle of the inlet guide vane from the second angle to a third angle larger than or equal to the first angle but smaller than the second angle, during the predetermined period during which the output value of the steam turbine is being maintained at the constant, predetermined value.

* * * * *